(12) United States Patent
Ishii et al.

(10) Patent No.: US 6,486,265 B1
(45) Date of Patent: Nov. 26, 2002

(54) METHOD FOR SURFACE MODIFICATION OF MOLDED ARTICLE OF PLASTIC AND METHOD FOR MODIFYING POLYMER

(75) Inventors: Yasutaka Ishii, Takatsuki; Yoshinori Funaki; Tatsuya Nakano, both of Himeji, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/719,395

(22) PCT Filed: Apr. 7, 2000

(86) PCT No.: PCT/JP00/02255

§ 371 (c)(1), (2), (4) Date: Feb. 22, 2001

(87) PCT Pub. No.: WO00/61665

PCT Pub. Date: Oct. 19, 2000

(30) Foreign Application Priority Data

Apr. 12, 1999 (JP) .............................. 11-103441
Apr. 12, 1999 (JP) .......................... 11-103442

(51) Int. Cl.$^7$ .............................. C08F 8/00; C08F 6/00; C08F 6/06; C08J 3/00; C08J 7/02
(52) U.S. Cl. .................... 525/375; 525/355; 525/359.2; 525/432; 525/437; 528/483; 528/487; 528/490; 528/492
(58) Field of Search ................................ 528/483, 487, 528/490, 492; 525/355, 359.2, 375, 432, 437

(56) References Cited

U.S. PATENT DOCUMENTS 4,701,290 A    10/1987  Eschwey et al. ........... 264/40.1

FOREIGN PATENT DOCUMENTS

JP    A51117768    10/1976
JP    A5663432     5/1981

*Primary Examiner*—Rabon Sergent
(74) *Attorney, Agent, or Firm*—Birch, Stewart, Kolasch & Birch, LLP

(57) ABSTRACT

An invented method for the surface modification of a molded plastic treats a molded plastic with an oxygen-atom-containing gas such as oxygen, carbon monoxide, a nitrogen oxide, or a sulfur oxide in the presence of N-hydroxyphthalimide or another imide compound represented by the following formula (1):

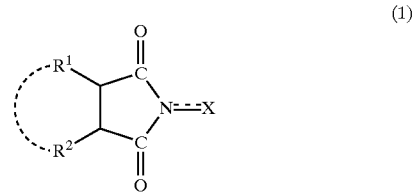

wherein $R^1$ and $R^2$ are each, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, or $R^1$ and $R^2$ may be combined to form a double bond or an aromatic or non-aromatic ring; X is an oxygen atom or a hydroxyl group. An invented method for modifying a polymer treats a polymer with an oxygen-atom-containing gas such as oxygen, carbon monoxide, a nitrogen oxide, or a sulfur oxide in the presence of the imide compound represented by the formula (1).

6 Claims, 8 Drawing Sheets

METHOD FOR SURFACE MODIFICATION OF MOLDED ARTICLE OF PLASTIC AND METHOD FOR MODIFYING POLYMER

This application is the national phase under 35 U.S.C. § 371 of PCT International Application No. PCT/JP00/02255 which has an International filing date of Apr. 7, 2000, which designated the United States of America.

TECHNICAL FIELD

The present invention relates to a method for the surface modification of a molded plastic, and specifically, it relates to a method for the surface modification which imparts adhesion or adhesive property to coating films, antistatic property and other characteristics to the surface of the molded plastic, as well as to a surface-modified molded plastic obtained by the method. The present invention also relates to a method for modifying a polymer, and specifically it relates to a method for modifying a polymer, which can impart antistatic property and other characteristics to the polymer by the introduction of a polar group, as well as to a modified polymer obtained by the method.

BACKGROUND ART

Many of resins for use in optical lenses, optical disks, and other optical materials require adhesion to coating films formed on the surfaces thereof, in addition to a high transparency, a low birefringence, and other basic characteristics. Add to this, demands are made on these resins to minimize changes due to environmental conditions in optical characteristics (especially, refractive index) and in dimension. Poly(methyl methacrylate) (PMMA), a typical transparent resin, is excellent, for example, in adhesive property and adhesion to coating films, but highly absorbs moisture and therefore largely changes in refractive index, which causes changes in focal distance. Accordingly, PMMA cannot be used as optical lenses in, for example, cameras. In addition, PMMA greatly changes in dimension due to moisture absorption, and when PMMA is applied to magneto-optic disks and other applications in which an inorganic film is applied thereon, the inorganic film cracks with dimensional change. A polycarbonate (PC) predominantly used for optical disks is relatively free from the above problems but exhibits a high birefringence.

On the other hand, to solve the problems due to moisture absorption, polyolefin resins each having a non-aromatic ring introduced into a principle chain (trade names: APO and ZEONEX, etc.) have been reported as optical material polymers in recent years. However, this resin has a high hydrophobicity which is a feature of polyolefin polymers, and therefore has a problem of a low adhesion to coating films formed on the surface. In order to solve this problem, a polyolefin resin (trade name: ARTON) having a polar group introduced into the non-aromatic ring is on the market. However, this resin inevitably has a higher hygroscopicity than a polyolefin resin having no polar group.

As is described above, the low water absorption which is required for ensuring optical stability and dimensional stability, and the hydrophilicity which contributes to adhesion to coating films are in trade-off relationship. To make these two characteristics compatible with each other, it is ideal that the inside of a molded article such as a lens or disk substrate is made of a hydrophobic polymer having a low hygroscopicity and the surface thereof alone is made of a hydrophilic polymer having a satisfactory adhesion to coating films.

Generally, known methods for the surface modification of plastics are, for example, (i) a method of coating the surface with a surfactant, (ii) a method of activating the surface through corona discharge, and (iii) a method of activating the surface though laser abrasion. However, the method (i) is insufficient in adhesion to coating films, although it is useful, for example, for imparting a temporary antistatic property. The methods (ii) and (iii) invite fine projections and depressions on the surfaces of plastics.

On the other hand, many of polymers for general use such as polyethylenes, polypropylenes, and polystyrenes have no free polar group or reactive functional group in a molecule and have a strongly hydrophobic characteristic, and are therefore generally static-prone. Accordingly, these polymers are usually incorporated with antistatic agents prior to use. However, this technique often invites a problem of bleeding out of the antistatic agents. The polymer itself must have a polar group to avoid this problem.

Generally, known methods for producing a polymer having a polar group include, for example, (i) a method of copolymerizing a material with a monomer having a polar group in a polymerization step, (ii) a method of converting an inherently hydrophilic polymer such as cellulose acetate into a hydrophobic polymer and then controlling the degree of esterification thereof through deesterification (saponification), (iii) a method of converting an aromatic ring of a polymer having the aromatic ring such as benzene ring into a functional group, and (iv) a method of combining a hydrophilic group such as carboxyl group with an unsaturated moiety of an aliphatic cyclic hydrocarbon polymer having the unsaturated-bond moiety such as dicyclopentadiene.

However, these methods are much limited in their application range. For example, a special monomer is required for converting an aromatic ring into a functional group, or the method can be applied only to a specific polymer previously having a functional group such as a hydroxyl group or an unsaturated moiety.

As a possible solution to the problems, there is a method of introducing a polar group into a principle chain through oxidization of, for example, a polypropylene. However, according to conventional oxidation techniques, the principle chain is liable to cleave to thereby yield a low molecular weight product.

DISCLOSURE OF INVENTION

Accordingly, it is an object of the present invention to provide a method for the surface modification of a molded plastic, which can impart hydrophilicity only to the surface without significantly varying the water absorption of the molded plastic.

It is another object of the present invention to provide a method for modifying a surface of a plastic, which can hydrophilize only the surface of a molded article made of a hydrophobic polymer to thereby improve adhesion to coating films, adhesive property, and antistatic property.

A further object of the present invention is to provide a method for the surface modification of a molded plastic, which can hydrophilize the surface without causing projections and depressions on the surface.

Yet another object of the present invention is to provide a surface-modified molded plastic which is satisfactory in optical and dimensional stability and has excellent adhesion to coating films, adhesive property and a high antistatic property.

A still further object of the present invention is to provide a versatile method of modifying a polymer, which can easily introduce a polar group into a polymer, especially to a hydrophobic polymer.

It is another object of the present invention to provide a method for modifying a polymer, which can introduce a polar group into the polymer without cleaving a principle chain.

It is still another object of the present invention to provide a method for modifying a polymer, which can introduce a desired polar group into the polymer in a desired proportion.

A yet further object of the present invention is to provide a polymer having a satisfactory antistatic property.

After intensive investigations to achieve the above objects, the present inventors found that the treatment of a molded plastic with an oxygen-atom-containing gas in the presence of a specific catalyst can efficiently hydrophilize only the surface of the molded plastic, and that the treatment of a polymer with an oxygen-atom-containing gas in the presence of a specific catalyst can efficiently introduce a polar group into the polymer. The present invention has been accomplished based on these findings.

Specifically, the present invention provides a method for the surface modification of a molded plastic. The method includes the step of treating a molded plastic with an oxygen-atom-containing gas in the presence of an imide compound represented by the following formula (1):

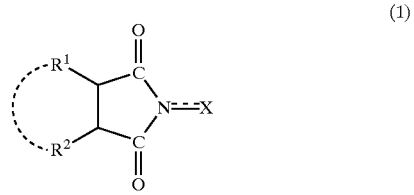

(1)

(wherein $R^1$ and $R^2$ are each, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, or $R^1$ and $R^2$ may be combined to form a double bond or an aromatic or non-aromatic ring; X is an oxygen atom or a hydroxyl group; and one or two of N-substituted cyclic imido group indicated in the formula (1) may be further formed on the $R^1$, $R^2$, or on the double bond or aromatic or non-aromatic ring formed by $R^1$ and $R^2$).

As the oxygen-atom-containing gas, at least one gas selected from oxygen, carbon monoxide, nitrogen oxides, and sulfur oxides can be used.

The present invention provides, in another aspect, a surface-modified molded plastic obtained by treating a molded plastic according to the aforementioned method.

In a further aspect, the present invention provides a method for modifying a polymer, which includes the step of treating a polymer with a oxygen-atom-containing gas in the presence of the imide compound represented by the formula (1).

At least one gas selected from oxygen, carbon monoxide, nitrogen oxides, and sulfur oxides can be used as the oxygen-atom-containing gas.

In yet another aspect, the present invention provides a modified polymer obtained by treating a polymer according to the aforementioned method.

BEST MODE FOR CARRYING OUT THE INVENTION

Figure 1:
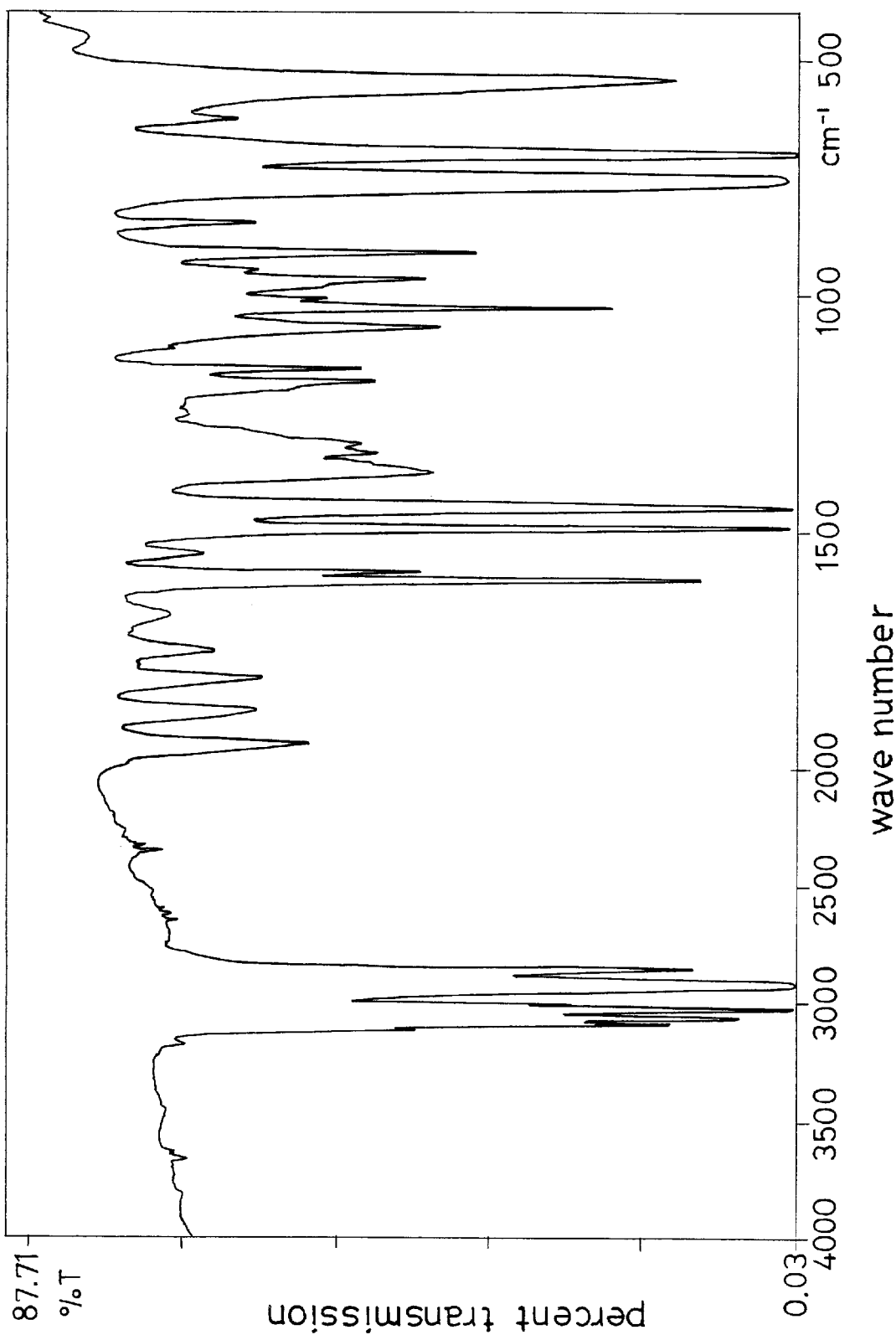
FIG. 1 is an infrared absorption spectrum of a polymer (polystyrene) prior to modification in Example 7.

In the invented method for the surface modification of a molded plastic, molded plastics to be treated include molded plastics made of a variety of polymers each having a primary, secondary, or tertiary carbon atom in a principle chain or in a side chain. In the invented method for modifying a polymer, polymers to be treated include a variety of polymers each having a primary, secondary, or tertiary carbon atom in a principle chain or in a side chain.

Polymers constituting the molded plastics and polymers to be modified include, but are not limited to, polyethylenes (e.g., low-density polyethylene, linear low-density polyethylene, and metallocene-catalyzed polyethylene), ethylene copolymers (e.g., ethylene-vinyl acetate copolymers, ethylene-acrylic ester copolymers, ethylene-methacrylic ester copolymers, ethylene-acrylic acid copolymers, ethylene-methacrylic acid copolymers, and ionomers), polypropylene, ethylene-propylene copolymers, poly-1-butene, poly(4-methylpentene) (TPX), polyisobutylene, and other olefinic resins; polybutadiene, polyisoprene, butadiene-styrene copolymers, butadiene-propylene copolymers, butadiene-acrylonitrile copolymers, isoprene-styrene copolymers, and other diene-based resins; ring-opened polymers or hydrogenated products thereof, of cyclic olefins such as cycloolefins (e.g., cyclobutene, cyclopentene, cycloheptene, cyclooctene, 3-methylcyclooctene, cyclooctadiene, cyclodecene, 3-methylcyclodecene, cyclododecene, and cyclododecatriene), norbornene derivatives, tetracyclododecene, and products from Diels-Alder reaction between dicyclopentadiene and a (meth)acrylic ester; copolymers of the cyclic olefins with ethylene and the other olefins; polystyrene, styrene-acrylonitrile copolymers, styrene-acrylonitrile-butadiene copolymers, poly(α-methylstyrene), and other polymers each containing an aromatic vinyl compound as a monomeric component; polymers each containing, as a monomeric component, an alicyclic vinyl compound such as vinylcyclohexane, vinylcyclohexene, vinyladamantane, vinylnorbornane, and vinylnorbornene; vinyl chloride-based resins; vinylidene chloride-based resins; vinyl acetate-based resins; cellulosic resins; polyethers; a variety of polyesters formed by polycondensation of a dibasic acid with a glycol; polyamides; and acrylic resins each containing an acrylic compound such as a (meth)acrylic ester as a monomeric component. The ring-opened polymers of cyclic olefins can be obtained by metathesis polymerization.

Of these polymers, preferred are hydrocarbon polymers having a saturated carbon chain as a principle chain, such as (A1) polyethylenes (e.g., low-density polyethylene and metallocene-catalyzed polyethylene), polypropylene, poly (4-methylpentene), and other olefinic resins, (A2) alicyclic hydrocarbon resins (e.g., hydrogenated products of ring-opened polymers of cyclic olefins, and copolymers of cyclic olefins with ethylene) each having a constitutional repeating unit represented by the following formula (2):

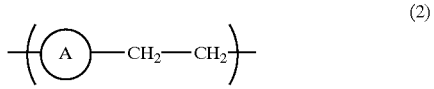

(2)

(wherein ring A is an alicyclic hydrocarbon ring to which one or more rings may be condensed), (A3) polystyrene, styrene-acrylonitrile copolymers, and other aromatic hydrocarbon resins (polymers each containing an aromatic vinyl compound as a monomeric component), and (A4) polymers each containing, as a monomeric component, an alicyclic vinyl compound such as vinyl cyclohexane and vinyladamantane.

The ring A includes, for example, cyclopentane ring, norbornane ring, tricyclo[4.3.0.1$^{2,5}$]decane ring, and tetracyclo[4.4.0.1$^{2,5}$. 1$^{7,10}$]dodecane ring. The ring A may have a substituent. Such substituents include, but are not limited to, methyl, ethyl, isopropyl, and other alkyl groups (e.g., $C_1$–$C_4$ alkyl groups); cyano group; and methoxycarbonyl, ethoxycarbonyl, butoxycarbonyl, and other ester groups (substituted oxycarbonyl groups).

Typical examples of the alicyclic hydrocarbon resins (A2) are available under the trade name of "ARTON" (produced by JSR), the trade name of "ZEONEX" (produced by Nippon Zeon Co., Ltd.), the trade name of "APEL" (produced by MITSUI CHEMICALS, INC.), and the trade name of "APO" (produced by MITSUI CHEMICALS, INC.).

As the polymers constituting the molded plastics and the polymers to be modified, (B) acrylic resins (acrylic resins each having an alicyclic carbon ring in a molecule) having a constitutional repeating unit represented by the following formula (3):

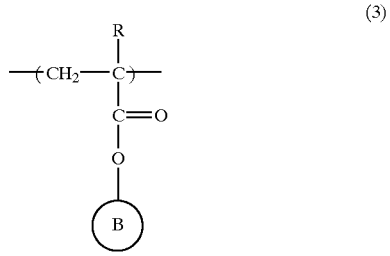

(3)

(wherein R is a hydrogen atom or a methyl group, and ring B is a monocyclic or polycyclic alicyclic carbon ring) are also preferred. Such acrylic resins exhibit a higher hydrophobicity and less changes in optical characteristics and in dimension due to moisture absorption, as compared with, for example, poly (methyl methacrylate) . In addition, poly (methyl acrylate) and poly (methyl methacrylate) are also preferred as the polymers to be modified.

The ring B may have a substituent such as methyl, ethyl, isopropyl, and other alkyl groups (e.g., $C_1$–$C_4$ alkyl groups). Typical examples of the ring B include tricyclo[5.2.1.0$^{2,6}$] decane ring, adamantane ring, norbornene ring, decalin ring, and perhydroanthracene ring. The acrylic resins each having an alicyclic carbon ring may be a homopolymer of a (meth) acrylic ester corresponding to the constitutional repeating unit represented by the formula (3) or a copolymer of the (meth)acrylic ester with another copolymerizable monomer such as methyl methacrylate.

The polymers constituting the molded plastics and the polymer to be modified should preferably have a secondary or tertiary carbon atom, from viewpoints of reactivity with respect to the oxygen-atom-containing gas. Among them, polymers each having a tertiary carbon atom are especially preferred.

Molding techniques for the molded plastics are not specifically limited, and the present invention can be applied to a variety of molded plastics obtained by conventional molding techniques such as injection molding, extrusion molding, blow molding, calendering, compression molding, transfer molding, laminate molding, and casting. The molded plastics may be molded articles obtained by heat curing or UV curing. The shapes of the molded plastics are also not specifically limited and maybe any form of, for example, film, sheet, column, block, pellet, and powder, and may exhibit a complicated shape.

According to the present invention, the imide compound represented by the formula (1) is used as a catalyst. Of the substituents $R^1$ and $R^2$ in the imide compound, the halogen atom includes iodine, bromine, chlorine and fluorine atoms. The alkyl group includes, but is not limited to, methyl, ethyl, propyl, isopropyl, butyl, isobutyl, s-butyl, t-butyl, hexyl, and decyl groups, and other straight- or branched-chain alkyl groups each having about 1 to 10 carbon atoms. Preferred alkyl groups are alkyl groups each having about 1 to 6 carbon atoms, of which lower alkyl groups each having about 1 to 4 carbon atoms are especially preferred.

The aryl group includes phenyl and naphthyl groups, for example. Illustrative cycloalkyl groups include cyclopentyl and cyclohexyl groups. Illustrative alkoxy groups are methoxy, ethoxy, isopropoxy, butoxy, t-butoxy, andhexyloxygroups, and other alkoxy groups each having about 1 to 10 carbon atoms, and preferably having about 1 to 6 carbon atoms. Among them, lower alkoxy groups each having about 1 to 4 carbon atoms are especially preferred.

Examples of the alkoxycarbonyl group include methoxycarbonyl, ethoxycarbonyl, isopropoxycarbonyl, butoxycarbonyl, t-butoxycarbonyl, and hexyloxycarbonyl groups, and other alkoxycarbonyl groups each having about 1 to 10 carbon atoms in the alkoxy moiety. Preferred carbonyl groups are alkoxycarbonyl groups each having about 1 to 6 carbon atoms in the alkoxy moiety, of which lower alkoxycarbonyl groups each having about 1 to 4 carbon atoms in the alkoxy moiety are especially preferred. Illustrative acyl groups include formyl, acetyl, propionyl, butyryl, isobutyryl, valeryl, isovaleryl, and pivaloyl groups, and other acyl groups each having about 1 to 6 carbon atoms.

The substituents $R^1$ and $R^2$ may be identical to or different from each other. The substituents $R^1$ and $R^2$ in the formula (1) may be combined with each other to form a double bond, or an aromatic or non-aromatic ring. The preferred aromatic or non-aromatic ring has about 5 to 12 members, and particularly about 6 to 10 members. The ring may be a heterocyclic ring or condensed heterocyclic ring, but it is often a hydrocarbon ring. Such rings include, for example, non-aromatic alicyclic rings (e.g., cyclohexane ring and other cycloalkane rings which may have a substituent; and cyclohexene ring and other cycloalkene rings which may have a substituent), non-aromatic bridged rings (e.g., 5-norbornene ring and other bridged hydrocarbon rings which may have a substituent), benzene ring, naphthalene ring, and other aromatic rings (including condensed rings)

which may have a substituent. The ring is composed of an aromatic ring in many cases. The ring may have a substituent. Such substituents include, but are not limited to, alkyl groups, haloalkyl groups, hydroxyl group, alkoxy groups, carboxyl group, alkoxycarbonyl groups, acyl groups, nitro group, cyano group, amino group, and halogen atoms.

In the formula (1), X represents an oxygen atom or a hydroxyl group, and the bond between the nitrogen atom N and X is a single bond or a double bond.

One or two of N-substituted cyclic imido group indicated in the formula (1) may be further formed on $R^1$, $R^2$, or on the double bond or aromatic or non-aromatic ring formed by $R^1$ and $R^2$. For example, when $R^1$ or $R^2$ is an alkyl group having two or more carbon atoms, the N-substituted cyclic imido group may be formed together with the adjacent two carbon atoms constituting the alkyl group. Likewise, when $R^1$ and $R^2$ are combined with each other to form a double bond, the N-substituted cyclic imido group may be formed together with the double bond. In case that $R^1$ and $R^2$ are combined with each other to form an aromatic or non-aromatic ring, the N-substituted cyclic imido group may be formed with the adjacent two carbon atoms constituting the ring.

Preferred imide compounds include compounds of the following formulae:

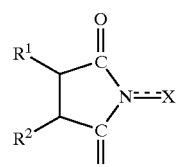
(1a)

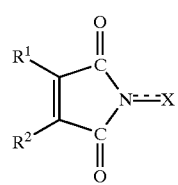
(1b)

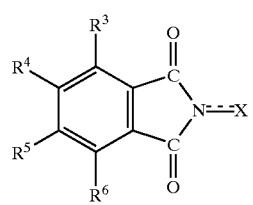
(1c)

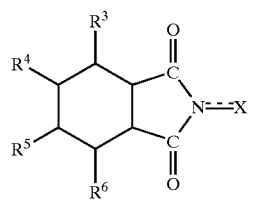
(1d)

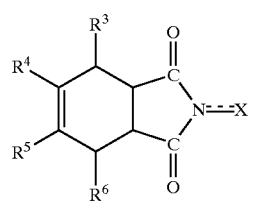
(1e)

-continued

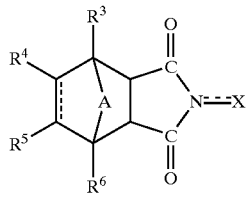
(1f)

(wherein $R^3$ to $R^6$ are each, identical to or different from one another, a hydrogen atom, an alkyl group, a haloalkyl group, a hydroxyl group, an alkoxy group, a carboxyl group, an alkoxycarbonyl group, an acyl group, a nitro group, a cyano group, an amino group, or a halogen atom, or adjacent groups of $R^3$ to $R^6$ may be combined with each other to form an aromatic or non-aromatic ring; in the formula (1f), A is a methylene group or an oxygen atom, and $R^1$, $R^2$ and X have the same meanings as defined above, where one or two of N-substituted cyclic imido group indicated in the formula (1c) may be further formed on a benzene ring in the formula (1c)).

In the substituents $R^3$ to $R^6$, the alkyl group includes similar alkyl groups to those exemplified above, especially alkyl groups each having about 1 to 6 carbon atoms. The haloalkyl group includes trifluoromethyl group, and other haloalkyl groups each having about 1 to 4 carbon atoms. The alkoxy group includes similar alkoxy groups to those mentioned above, and especially lower alkoxy groups each having about 1 to 4 carbon atoms. The alkoxycarbonyl group includes similar alkoxycarbonyl groups to those described above, particularly lower alkoxycarbonyl groups each having about 1 to 4 carbon atoms in the alkoxy moiety. The acyl group includes similar acyl groups to those described above, especially acyl groups each having about 1 to 6 carbon atoms. Illustrative halogen atoms include fluorine, chlorine and bromine atoms. Each of the substituents $R^3$ to $R^6$ is usually a hydrogen atom, a lower alkyl group having about 1 to 4 carbon atoms, a carboxyl group, a nitro group, or a halogen atom in many cases. The ring formed by $R^3$ to $R^6$ includes similar rings to the aforementioned rings which are formed by $R^1$ and $R^2$. Among them, aromatic or non-aromatic 5- to 12-membered rings are particularly preferred.

Typically preferred imide compounds include, for example, N-hydroxysuccinimide, N-hydroxymaleimide, N-hydroxyhexahydrophthalimide, N,N'-dihydroxycyclohexanetetracarboximide, N-hydroxyphthalimide, N-hydroxytetrabromophthalimide, N-hydroxytetrachlorophthalimide, N-hydroxychlorendimide, N-hydroxyhimimide, N-hydroxytrimellitimide, N,N'-dihydroxypyromellitimide, and N,N'-dihydroxynaphthalenetetracarboximide.

The imide compounds can be prepared by a conventional imidation reaction (a reaction for the formation of an imide), such as a process that comprises the steps of allowing a corresponding acid anhydride to react with hydroxylamine $NH_2OH$ for ring-opening of an acid anhydride group, and closing the ring to form an imide.

Such acid anhydrides include, but are not limited to, succinic anhydride, maleic anhydride, and other saturated or unsaturated aliphatic dicarboxylic anhydrides, tetrahydrophthalic anhydride, hexahydrophthalic anhydride (1,2-cyclohexanedicarboxylic anhydride), 1,2,3,4-cyclohexanetetracarboxylic 1,2-dianhydride, and other saturated or unsaturated non-aromatic cyclic polycarboxylic anhydrides (alicyclic polycarboxylic anhydrides), HET anhydride (chlorendic anhydride), himic anhydride, and other bridged cyclic polycarboxylic anhydrides (alicyclic polycarboxylic anhydrides), phthalic anhydride, tetrabromophthalic anhydride, tetrachlorophthalic anhydride, nitrophthalic anhydride, trimellitic anhydride, methylcyclohexenetricarboxylic anhydride, pyromellitic anhydride, mellitic anhydride, 1,8;4,5-naphthalenetetracarboxylic dianhydride, and other aromatic polycarboxylic anhydrides.

Typically preferred imide compounds include N-hydroxyimide compounds derived from alicyclic polycarboxylic anhydrides or aromatic polycarboxylic anhydrides, of which N-hydroxyphthalimide and other N-hydroxyimide compounds derived from aromatic polycarboxylic anhydrides are especially preferred. Each of the imide compounds represented by the formula (1) can be used alone or in combination.

In the invented method, the amount of the imide compound represented by the formula (1) for use as a catalyst can be selected within a wide range, and is for example such that the concentration in a treating solution for use in the treatment of the molded plastic or the polymer is about 0.001 to 1 mol/l, and preferably about 0.01 to 0.5 mol/l.

According to the present invention, a promoter (co-catalyst) can be used in addition to the imide compound. Such promoters include metallic compounds. The use of a metallic compound as the promoter can improve the rate and selectivity of a reaction.

Metallic elements constituting the metallic compounds are not critical, but elements of Groups 2 to 15 of the Periodic Table of Elements are used in many cases. The term "metallic element" as used in the present description also includes boron B. Examples of the metallic elements include, of the Periodic Table of Elements, Group 2 elements (e.g., Mg, Ca, Sr, and Ba), Groups 3 elements (e.g., Sc, lanthanoid elements, and actinoid elements), Group 4 elements (e.g., Ti, Zr, and Hf), Group 5 elements (e.g., V), Group 6 elements (e.g., Cr, Mo, and W), Group 7 elements (e.g., Mn), Group 8 elements (e.g., Fe and Ru), Group9elements (e.g., Co and Rh), Group 10 elements (e.g., Ni, Pd, and Pt), Group 11 elements (e.g., Cu), Group 12 elements (e.g., Zn), Groups 13 elements (e.g., B, Al, and In), Group 14 elements (e.g., Sn and Pb), and Group 15 elements (e.g., Sb and Bi). Preferred metallic elements include transition metal elements (elements of Groups 3 to 12 of the Periodic Table of Elements). Among them, elements of the Groups 5 to 11, especially elements of Groups 5 to 9 of the Periodic Table of Elements are preferred, of which V, Mo, Mn, and Co are typically preferred. The valence of the metallic element is not critical, and is, for example, about 0 to 6.

The metallic compounds include, but are not limited to, elementary substances, hydroxides, oxides (including complex oxides), halides (fluorides, chlorides, bromides, and iodides), salts of oxoacids (e.g., nitrates, sulfates, phosphates, borates, and carbonates), salts of isopolyacids, salts of heteropolyacids, and other inorganic compounds of the aforementioned metallic elements; salts of organic acids (e.g., acetates, propionates, hydrocyanates, naphthenates, and stearates), complexes, and other organic compounds of the metallic elements. Ligands constituting the complexes include OH (hydroxo), alkoxy (e.g., methoxy, ethoxy, propoxy, and butoxy), acyl (e.g., acetyl and propionyl), alkoxycarbonyl (e.g., methoxycarbonyl and ethoxycarbonyl), acetylacetonato, cyclopentadienyl group, halogen atoms (e.g., chlorine and bromine), CO, CN, oxygen atom, $H_2O$ (aquo), phosphines (e.g., triphenylphosphine and other triarylphosphines) and other phosphorus compounds, $NH_3$ (ammine), NO, $NO_2$ (nitro), $NO_3$ (nitrato), ethylenediamine, diethylenetriamine, pyridine, phenanthroline, and other nitrogen-containing compounds.

Examples of the metallic compounds include, by taking cobalt compounds as example, cobalt hydroxide, cobalt oxide, cobalt chloride, cobalt bromide, cobalt nitrate, cobalt sulfate, cobalt phosphate, and other inorganic compounds; cobalt acetate, cobalt naphthenate, cobalt stearate, and other salts of organic acids; acetylacetonatocobalt and other complexes, and other divalent or trivalent cobalt compounds. Illustrative vanadium compounds include vanadium hydroxide, vanadium oxide, vanadium chloride, vanadyl chloride, vanadium sulfate, vanadyl sulfate, sodiumvanadate, andotherinorganic compounds; acetylacetonatovanadium, vanadyl acetylacetonato, and other complexes, and other vanadium compounds having a valence of 2 to 5. Examples of compounds of the other metallic elements include compounds corresponding to the above-mentioned cobalt or vanadium compounds. Each of these metallic compounds can be used alone or in combination.

The amount of the metallic compound is, for example, about 0.001 to 0.1 mole, and preferably about 0.005 to 0.08 mole, relative to 1 mole of the imide compound.

As the promoters for use in the present invention, organic salts each composed of a polyatomic cation or a polyatomic anion and its counter ion can also be used, which polyatomic cation or anion contains a Group 15 or Group 16 element of the Periodic Table of Elements having at least one organic group combined therewith. The use of the organic salt as the promoter can further enhance or improve the rate and selectivity of the reaction.

In the organic salts, the Group 15 elements of the Periodic Table of Elements include N, P, As, Sb, and Bi, and the Group 16 elements of the Periodic Table of Elements include, for example, O, S, Se and Te. Preferred elements are N, P, As, Sb, and S, of which N, P, and S are typically preferred.

The organic groups to be combined with atoms of the elements include, but are not limited to, hydrocarbon groups which may have a substituent, and substituted oxy groups. Such hydrocarbon groups include, but are not limited to, methyl, ethyl, propyl, isopropyl, butyl, isobutyl, s-butyl, t-butyl, pentyl, hexyl, octyl, decyl, tetradecyl, hexadecyl, octadecyl, allyl, and other straight- or branched-chain aliphatic hydrocarbon groups (alkyl groups, alkenyl groups, and alkynyl groups) each having about 1 to 30 carbon atoms (preferably about 1 to 20 carbon atoms); cyclopentyl, cyclohexyl, and other alicyclic hydrocarbon groups each having about 3 to 8 carbon atoms; and phenyl, naphthyl, and other aromatic hydrocarbon groups each having about 6 to 14 carbon atoms. Substituents which the hydrocarbon groups may have include, but are not limited to, halogen atoms, oxo group, hydroxyl group, substituted oxy groups (e.g., alkoxy groups, aryloxy groups, and acyloxy groups), carboxyl group, substituted oxycarbonyl groups, substituted or unsubstituted carbamoyl groups, cyano group, nitro group, substituted or unsubstituted amino groups, alkyl groups (e.g., methyl, ethyl, and other $C_1$–$C_4$ alkyl groups), cycloalkyl groups, aryl groups (e.g., phenyl and naphthyl groups), and heterocyclic groups. Preferred hydrocarbon groups include, for example, alkyl groups each having about 1 to 30 carbon atoms, and aromatic hydrocarbon groups (especially, phenyl group or naphthyl group) each having about 6 to 14 carbon atoms. The substituted oxy groups include, but are not limited to, alkoxy groups, aryloxy groups and aralkyloxy groups.

Typical examples of the organic salts include organic onium salts such as organic ammonium salts, organic phosphonium salts, and organic sulfonium salts. Examples of organic ammonium salts include tetramethylammonium chloride, tetraethylammonium chloride, tetrabutylammonium chloride, tetrahexylammonium chloride, trioctylmethylammonium chloride, triethylphenylammonium chloride, tributyl(hexadecyl)ammonium chloride, di(octadecyl) dimethylammonium chloride, and other quaternary ammonium chlorides, corresponding quaternary ammonium bromides, and other quaternary ammonium salts each having four hydrocarbon groups combined with a nitrogen atom; dimethylpiperidinium chloride, hexadecylpyridinium chloride, methylquinolinium chloride, and other cyclic quaternary ammonium salts. Examples of the organic phosphonium salts include tetramethylphosphonium chloride, tetrabutylphosphonium chloride, tributyl(hexadecyl)phosphonium chloride, triethylphenylphosphonium chloride, and other quaternary phosphonium chlorides, corresponding quaternary phosphonium bromides, and other quaternary phosphonium salts each having four hydrocarbon groups combined with a phosphorus atom. Examples of the organic sulfonium salts include triethylsulfonium iodide, ethyldiphenylsulfonium iodide, and other sulfonium salts each having three hydrocarbon groups combined with a sulfur atom.

The organic salts also include methanesulfonates, ethanesulfonates, octanesulfonates, dodecanesulfonates, and other alkyl-sulfonates (e.g., $C_6$–$C_{18}$ alkyl-sulfonates); benzenesulfonates, p-toluenesulfonates, naphthalenesulfonates, decylbenzenesulfonates, dodecylbenzenesulfonates, and other aryl-sulfonates which may be substituted with an alkyl group (e.g., $C_6$–$C_{18}$ alkyl-substituted aryl-sulfonates); sulfonic acid type ion exchange resins (ion exchangers); and phosphonic acid type ion exchange resins (ion exchangers).

The amount of the organic salt is, for example, about 0.001 to 0.1 mole, and preferably about 0.005 to 0.08 mole, relative to 1 mole of the imide compound.

In the present invention, a strong acid can be used in combination with the imide compound. The combination use of the imide compound and the strong acid can efficiently introduce an oxo group into a methylene carbon atom (secondary carbon atom) of the polymer constituting the molded plastic or the polymer to be modified, with the use of oxygen as the oxygen-atom-containing gas.

The strong acids include, for example, compounds each having a pKa of 2 or less (25° C.). The pKa of the strong acid is preferably about −15 to 2, and more preferably about −10 to 0. Such strong acids include, but are not limited to, hydrogen halides (hydrogen fluoride, hydrogen chloride, hydrogen bromide, and hydrogen iodide), hydrohalogenic acids (hydrofluoric acid, hydrochloric acid, hydrobromic acid, and hydroiodic acid), oxoacids (e.g., sulfuric acid, nitric acid, phosphoric acid, chromic acid and other metallic acids, chloric acid, and other halogen acids), super strong acids (e.g., $ClSO_3H$, $H_2SO_4$—$SO_3$, $FSO_3H$, $FSO_3H$—$SO_3$, $FSO_3H$—$SbF_5$, and $HF$—$SbF_5$), heteropolyacids (e.g., silicomolybdic acid, silicotungstic acid, phosphomolybdic acid, phosphotungstic acid, phosphovanadomolybdic acid, and phosphovanadotungstic acid), and sulfonic acids (e.g., methanesulfonic acid, trifluoromethanesulfonic acid, benzenesulfonic acid, p-toluenesulfonic acid, an d naphthalenesulfonic acid). Preferred strong acids include inorganic acids such as hydrogen halides, hydrohalogenic acids, sulfuric acid, and heteropolyacids. Each of these strong acids can be used alone or in combination. The amount of the strong acid is, for example, about 0.001 to 3 moles, and preferably about 0.1 to 1 mole, relative to 1 mole of the imide compound According to the invented method, a reaction system may include a radical generator or a radical reaction accelerator. Such components include, but are not limited to, halogens (e. g., chlorine and bromine), peracids (e.g., peracetic acid and m-chloroperbenzoic acid), and peroxides (e.g., hydrogen peroxide, t-butyl hydroperoxide (TBHP), and other hydroperoxides). The existence of these components in the system can accelerate a reaction in some cases. The amount of the aforementioned component is, for example, about 0.001 to 0.1 mole relative to 1 mole of the imide compound.

In the present invention, a co-reacting agent (co-reactant; a compound which can react with an oxygen-atom-containing gas in the presence of the imide compound; refer to, for example, Japanese Unexamined Patent Application Publication No. 8-38909, and Japanese Unexamined Patent Application Publication No. 9-327626) can coexist in the reaction system. The coexistence of the co-reacting agent in the reaction system can accelerate the reaction and the surface of molded plastic or the polymer can be hydrophilized in a short time in many cases. This is probably because the co-reacting agent plays a role as a radical generator.

As such co-reacting agents, use may be made of, for example, at least one compound selected from (a) primary or secondary alcohols, (b) compounds each having a carbon-hydrogen bond at the adjacent position to an unsaturated bond, (c) compounds each having a methine carbon atom, (d) cycloalkanes, (e) non-aromatic heterocyclic compounds each having a carbon-hydrogen bond at the adjacent position to a hetero atom, (f) conjugated compounds, (g) aromatic hydrocarbons, (h) thiols, (i) ethers, (j) sulfides, (k) aldehydes or thioaldehydes, and (l) amines. These compounds may have a variety of substituents. Such substituents include, but are not limited to, halogen atoms, oxo group, hydroxyl group, mercapto group, substituted oxy groups (e.g., alkoxy groups, aryloxy groups, and acyloxy groups), substituted thio groups, carboxyl group, substituted oxycarbonyl groups, substituted or unsubstituted carbamoyl groups, cyano group, nitro group, substituted or unsubstituted amino groups, alkyl groups, alkenyl groups, alkynyl groups, cycloalkyl groups, cycloalkenyl groups, aryl groups (e.g., phenyl and naphthyl groups), aralkyl groups, and heterocyclic groups.

(a) Primary or Secondary Alcohols

The primary or secondary alcohols (a) include a wide variety of alcohols. These alcohols may be any of monohydric, dihydric or polyhydric alcohols. Such primary alcohols include, but are not limited to, methanol, ethanol, 1-propanol, 1-butanol, 1-decanol, ethylene glycol, and other saturated or unsaturated aliphatic primary alcohols; cyclopentylmethyl alcohol, cyclohexylmethyl alcohol, and other saturated or unsaturated alicyclic primary alcohols; benzyl alcohol, 2-phenylethyl alcohol, and other aromatic primary alcohols; and 2-hydroxymethylpyridine, and other heterocyclic alcohols. Illustrative secondary alcohols include 2-propanol, s-butyl alcohol, and other saturated or unsaturated aliphatic secondary alcohols; cyclopentanol, cyclohexanol, and other saturated or unsaturated alicyclic secondary alcohols; 1-phenylethanol, 1-phenylpropanol, 1-phenylmethylethanol, diphenylmethanol, and other aromatic secondary alcohols; and 1-(2-pyridyl)ethanol, and other heterocyclic secondary alcohols. Preferred primary or secondary alcohols (a) include secondary alcohols (e.g., s-butyl alcohol and other aliphatic secondary alcohols, cyclohexanol and other alicyclic secondary alcohols, 1-phenylethanol and other aromatic secondary alcohols). Each of the alcohols (a) can be used alone or in combination.

(b) Compounds Each Having a Carbon-hydrogen Bond at the Adjacent Position to an Unsaturated Bond The compounds (b) each having a carbon-hydrogen bond at the adjacent position to an unsaturated bond include, for example, (b1) aromatic compounds each having a methyl group or methylene group at the adjacent position to an aromatic ring (so-called benzyl position), and (b2) non-aromatic compounds each having a methyl group or methylene group at the adjacent position to an unsaturated bond (e.g., a carbon-carbon triple bond or a carbon-oxygen double bond). In the aromatic compounds (b1), the aromatic ring may be either of an aromatic hydrocarbon ring or an aromatic heterocyclic ring. The methylene group at the adjacent position to an aromatic ring may be a methylene group constituting a non-aromatic ring condensed to the aromatic ring. Such aromatic compounds each having a methyl group at the adjacent position to an aromatic ring include aromatic hydrocarbons having one to six methyl groups substituted on the aromatic ring (e.g., toluene, xylene, and methylnaphthalene), and heterocyclic compounds each having about one to six methyl groups substituted on a heterocyclic ring (e.g., 4-methylpyridine). Illustrative aromatic compounds each having a methylene group at the adjacent position to an aromatic ring include, but are not limited to, aromatic hydrocarbons each having an alkyl group or substituted alkyl group having 2 or more carbon atoms (e.g., ethylbenzene, propylbenzene, and diphenylmethane), aromatic heterocyclic compounds each having an alkyl group or substituted alkyl group having 2 or more carbon atoms (e.g., 4-ethylpyridine), and compounds in which a non-aromatic ring is condensed to an aromatic ring, and the non-aromatic ring has a methylene group at the adjacent position to the aromatic ring (e.g., dihydronaphthalene, indene, indan, tetralin, fluorene, acenaphthene, phenalene, and xanthene).

The non-aromatic compounds (b2) each having a methyl group or methylene group at the adjacent position to an unsaturated bond include, but are not limited to, (b2-1) unsaturated chain hydrocarbons each having a methyl group or methylene group at the adjacent position to a carbon-carbon triple bond, and (b2-2) compounds each having a methyl group or methylene group at the adjacent position to a carbonyl group. The unsaturated chain hydrocarbons (b2-1) include, for example, methylacetylene, and other alkynes each having about 3 to 20 carbon atoms. The compounds (b2-2) include, but are not limited to, ketones (e.g., acetone, methyl ethyl ketone, 3-pentanone, acetophenone, and other chain ketones; and cyclohexanone and other cyclic ketones), and carboxylic acids or derivatives thereof (e.g., malonic acid, succinic acid, glutaric acid, and esters of these acids).

(c) Compounds Each Having a Methine Carbon Atom

The compounds (c) each having a methine carbon atom (or a tertiary carbon atom) include (c1) cyclic compounds each having a methine group (i.e., a methine carbon-hydrogen bond) as a constitutive unit of a ring, and (c2) chain compounds each having a methine carbon atom. The cyclic compounds (c1) include, for example, (c1-1) bridged cyclic compounds each having at least one methine group, and (c1-2) non-aromatic cyclic compounds (e.g., alicyclic hydrocarbons) each having a hydrocarbon group combined with a ring. The bridged cyclic compounds also include compounds in which two rings commonly possess two carbon atoms, such as hydrogenated products of condensed polycyclic aromatic hydrocarbons.

Illustrative bridged cyclic compounds (c1-1) include decalin, bicyclo[2.2.2]octane, pinane, pinene, bornane, norbornane, norbornene, camphor, endotricyclo[5.2.1.0$^{2,6}$] decane, adamantane, 1-adamantanol, perhydroanthracene, and other bridged cyclic hydrocarbons or bridged heterocyclic compounds each having two to four rings, and derivatives thereof. These bridged cyclic compounds each have a methine carbon atom at the bridgehead position (corresponding to a junction position when two rings commonly possess two atoms). Examples of the non-aromatic cyclic compounds (c1-2) each having a hydrocarbon group combined with a ring include 1-methylcyclopentane, 1-methylcyclohexane, and other alicyclic hydrocarbons each having a hydrocarbon group (e.g., an alkyl group) combined with a ring, and derivatives thereof. The non-aromatic cyclic compounds (c1-2) each having a hydrocarbon group combined with ring have a methine carbon atom at the bonding site between the ring and the hydrocarbon group.

Chain compounds (c2) each having a methine carbon atom include chain hydrocarbons each having a tertiary carbon atom, such as isobutane, isopentane, isohexane, 3-methylpentane, and other aliphatic hydrocarbons, and derivatives thereof.

(d) Cycloalkanes

The cycloalkanes (d) include, but are not limited to, cyclopentane, cyclohexane, cycloheptane, cyclooctane, cyclododecane, cyclotetradecane, and derivatives of these compounds.

(e) Non-aromatic heterocyclic compounds each having a carbon-hydrogen bond at the adjacent position to a hetero atom In the non-aromatic heterocyclic compounds (e) each having a carbon-hydrogen bond at the adjacent position to a hetero atom, non-aromatic heterocyclic rings include, but are not limited to, heterocyclic rings each having at least one hetero atom selected from nitrogen atom, oxygen atom and sulfur atom. To each of the heterocyclic rings, one or two of benzene rings, cyclohexane rings, pyridine rings or other aromatic or non-aromatic rings may be condensed. The heterocyclic rings include, for example, dihydrofuran, tetrahydrofuran, pyran, dihydropyran, tetrahydropyran, pyrrolidine, piperidine, piperazine, morpholine, indoline, chroman, and isochroman.

(f) Conjugated Compounds

The conjugated compounds (f) include, for example, (f1) conjugated dienes, (f2) $\alpha,\beta$-unsaturated nitriles, and (f3) $\alpha,\beta$-unsaturated carboxylic acids or derivatives thereof (e.g., esters, amides and anhydrides). The conjugated dienes (f1) include, but are not limited to, butadiene, and isoprene. The conjugated dienes (f1) also include vinyl acetylene and other compounds in which a double bond and a triple bond are conjugated. The $\alpha,\beta$-unsaturated nitriles (f2) include, for example, (meth)acrylonitrile. The $\alpha,\beta$-unsaturated carboxylic acids or derivatives thereof (f3) include, but are not limited to, (meth)acrylic acid; methyl (meth)acrylate, ethyl (meth)acrylate, and other (meth)acrylic esters; and (meth) acrylamide or derivatives thereof.

(g) Aromatic Hydrocarbons

The aromatic hydrocarbons (g) include, but are not limited to, benzene, naphthalene, acenaphthylene, phenanthrene, anthracene, naphthacene, and other aromatic compounds each having at least one benzene ring. Of these compounds, preferred are condensed polycyclic aromatic compounds in which at least plural benzene rings (e.g., two to ten benzene rings) are condensed. These aromatic hydrocarbons may each have one or more substituents. Examples of such aromatic compounds each having a substituent include 2-chloronaphthalene, 2-methoxynaphthalene, 1-methylnaphthalene, 2-methylnaphthalene, 2-methylanthracene, 2-t-butylanthracene, 2-carboxyanthracene, 2-ethoxycarbonylanthracene, 2-cyanoanthracene, 2-nitroanthracene, and 2-methylpentalene. To the benzene ring, a non-aromatic carbon ring, an aromatic heterocyclic ring, or a non-aromatic heterocyclic ring may be condensed.

(h) Thiols

The thiols (h) include, but are not limited to, methanethiol, ethanethiol, and other aliphatic thiols; cyclopentanethiol, and other alicyclic thiols; and phenylmethanethiol, and other aromatic thiols.

(i) Ethers

Examples of the ethers (i) include diethyl ether, dipropyl ether, and other aliphatic ethers; and anisole, dibenzyl ether, and other aromatic ethers.

(j) Sulfides

The sulfides (j) include, but are not limited to, diethyl sulfide, dipropyl sulfide, and other aliphatic sulfides; and methyl phenyl sulfide, ethyl phenyl sulfide, and other aromatic sulfides.

(k) Aldehydes or Thioaldehydes

The aldehydes include, but are not limited to, acetaldehyde, propionaldehyde, hexanal, decanal, succinaldehyde, glutaraldehyde, adipaldehyde, and other aliphatic aldehydes; formylcyclohexane, and other alicyclic aldehydes; benzaldehyde, nitrobenzaldehyde, cinnamaldehyde, salicylaldehyde, anisaldehyde, phthalaldehyde, isophthalaldehyde, terephthalaldehyde, and other aromatic aldehydes; and furfural, nicotinic aldehyde, and other heterocyclic aldehydes. The thioaldehydes include thioaldehydes corresponding to the aforementioned aldehydes.

(l) Amines

The illustrative amines (l) are primary or secondary amines such as methylamine, ethylamine, propylamine, butylamine, dimethylamine, diethylamine, ethylenediamine, hydroxylamine, ethanolamine, and other aliphatic amines; cyclohexylamine, and other alicyclic amines; benzylamine, toluidine, and other aromatic amines.

Of these co-reacting agents, preferred compounds are the (a) primary or secondary alcohols, (b) compounds each having a carbon-hydrogen bond at the adjacent position to an unsaturated bond, (c) compounds each having a methine carbon atom, and (d) cycloalkanes. Among them, typically preferred are secondary alcohols, (b1) aromatic compounds each having a methyl group or methylene group at the adjacent position to an aromatic ring (a so-called benzyl position), and adamantane and other bridged cyclic compounds each having a methine carbon atom. Such preferred compounds (b1) include, but are not limited to, toluene, ethylbenzene, and other aromatic hydrocarbons each having a methyl group or methylene group at the adjacent position to an aromatic ring; and fluorene, tetralin, and other compounds each having a non-aromatic ring condensed to an aromatic ring, and having a methylene group at a position in the non-aromatic ring adjacent to the aromatic ring.

Each of the co-reacting agents can be used alone or in combination. The amount of the co-reacting agent can be selected within a wide range, and is for example such that the concentration in a treating solution for use in the treatment of the molded plastic or the polymer is about 0.001 to 10 mol/l, preferably about 0.01 to 5 mol/l, and specifically about 0.1 to 3 mol/1. The co-reacting agent can also be used as a reaction solvent.

In the present invention, the system may further comprise a 1,2-dicarbonyl compound or its hydroxy reductant. When the 1, 2-dicarbonyl compound or its hydroxy reductant exits in the system and oxygen is used as the oxygen-containing gas, an acyl group is introduced into a carbon atom (especially, a methine carbon atom) constituting the polymer molecule of the molded plastic or the molecule of the polymer to be modified, and thereby the surface of the molded plastic or the polymer is hydrophilized.

The 1,2-dicarbonyl compound or its hydroxy reductant includes a compound represented by the following formula (4):

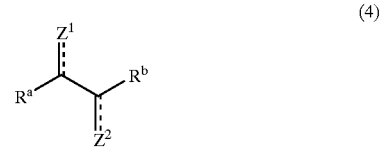

(wherein $R^a$ and $R^b$ are each, identical to or different from each other, a hydrogen atom, a hydrocarbon group, or a heterocyclic group, or $R^a$ and $R^b$ may be combined with each other to form a ring with adjacent two carbon atoms; and $Z^1$ and $Z^2$ are each, identical to or different from each other, an oxygen atom or a hydroxyl group).

Hydrocarbon groups in $R^a$ and $R^b$ include, but are not limited to, methyl, ethyl, propyl, isopropyl, butyl, isobutyl, s-butyl, t-butyl, pentyl, hexyl, octyl, decyl, tetradecyl, hexadecyl, octadecyl, allyl, and other straight- or branched chain aliphatic hydrocarbon groups (alkyl groups, alkenyl group, and alkynyl groups) each having about 1 to 20 (preferably 1 to 10, and particularlyl to 6) carbonatoms; cyclopentyl, cyclohexyl, and other alicyclic hydrocarbon groups (cycloalkyl groups and cycloalkenyl groups) each having about 3 to 8 carbon atoms; phenyl, naphthyl, and other aromatic hydrocarbon groups (aryl groups) each having about 6 to 14 carbon atoms.

Heterocylces in the heterocyclic group include, but are not limited to, tetrahydrofuran, pyrrolidine, piperidine, piperazine, morpholine, indoline, furan, oxazole, thiophene, pyrrole, pyrazole, imidazole, pyridine, pyridazine, pyrimidine, pyrazine, indole, quinoline, and other heterocyclic rings (including condensed rings) containing about one to three of at least one hetero atom selected from nitrogen atom, oxygen atom, and sulfur atom, and having about 3 to 15 members (preferably about 5 to 12 members, and more preferably about 5 or 6 members).

The hydrocarbon groups and heterocyclic groups may have a variety of substituents. Such substituents include, for example, halogenatoms, oxogroup, hydroxylgroup, substituted oxy groups (e.g., alkoxy groups, aryloxy groups, and acyloxy groups), carboxyl group, substituted oxycarbonyl groups, substituted or unsubstituted carbamoyl groups, cyano group, nitro group, substituted or unsubstituted amino groups, alkyl groups, cycloalkyl groups, aryl groups (e.g., phenyl and naphthyl groups), and heterocyclic groups. In many cases, $R^a$ and $R^b$ are identical groups.

$R^a$ and $R^b$ may be combined to form a ring with the adjacent two carbon atoms. Such rings include, for example, cyclopentane ring, cyclohexane ring, and other cycloalkane rings each having about 3 to 15 members (preferably 5 or 6 members). The rings may have such substituents as mentioned above.

Each of $Z^1$ and $Z^2$ is an oxygen atom or a hydroxyl group, and a bond between the carbon atom and $Z^1$ or $Z^2$ is a single bond or a double bond.

Of the compounds represented by the formula (4), preferred compounds include a compound represented by the following formula (4a):

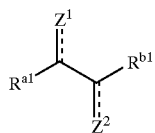

(4a)

(wherein $R^{a1}$ and $R^{b1}$ are each, identical to or different from each other, an alkyl group having 1 to 4 carbon atoms, a cycloalkyl group, or an aryl group, or $R^{a1}$ and $R^{b1}$ may be combined to form a ring with adjacent two carbon atoms; and $Z^1$ and $Z^2$ are each, identical to or different from each other, an oxygen atom or a hydroxyl group).

Typically preferred $R^{a1}$ and $R^{b1}$ are methyl group or ethyl group, of which methyl group is especially preferred. $R^{a1}$ and $R^{b1}$ are identical groups in many cases.

Preferred examples of the 1,2-dicarbonyl compounds include biacetyl (2,3-butanedione), 2,3-pentanedione, 3,4-hexanedione, bibenzoyl (benzil), acetylbenzoyl, cyclopentane-1,2-dione, cyclohexane-1,2-dione, and other α-diketones. Among them, biacetyl or the like is preferred. Preferred examples of the hydroxy reductant of the 1,2-dicarbonyl compound include acetoin, benzoin, and other α-keto-alcohols; 2,3-butanediol, 2,3-pentanediol, and other vicinal diols. Among them, acetoin and 2,3-butanediol are preferred, for example.

The amount of the 1,2-dicarbonyl compound or its hydroxy reductant is, for example, about 2 to 1000 moles, and preferably about 5 to 500 moles, relative to 1 mole of the imide compound. When the 1,2-dicarbonyl compound or its hydroxy reductant is used, the metallic compound may be used instead of, or in addition to the imide compound.

The oxygen-atom-containing gas (hereinafter referred to as "reaction gas") for use in the present invention include, for example, oxygen, carbon monoxide, nitrogen oxides, and sulfur oxides. Each of these gases can be used alone or in combination.

The oxygen may be either molecular oxygen or active oxygen. The molecular oxygen includes, but is not limited to, pure oxygen, and oxygen diluted with an inert gas such as nitrogen, helium, argon or carbon dioxide, as well as air. Molecular oxygen is often used as the oxygen.

The nitrogen oxides include, but are not limited to, $N_2O_3$, $N_2O$, NO, and $NO_2$. These substances (e.g., $N_2O$, NO, or $NO_2$) can be used in combination with oxygen. The sulfuroxides include, for example, $SO_2$ and $SO_3$. These substances (e.g., $SO_2$) can be used in combination with oxygen.

When oxygen is used as the reaction gas, a hydroxyl group, an oxo group, or a carboxyl group is introduced into a primary carbon atom (e.g., a methyl carbon atom at benzyl position or allyl position), into a secondary carbon atom (e.g., a methylene carbon atom at benzyl position or allyl position, or a methylene carbon atom constituting a non-aromatic carbon ring), or into a tertiary carbon atom (e.g., a methine carbon atom in a branched alkyl group or alkylene group, or a methine carbon atom at junction position or bridgehead position of a polycyclic group), of the polymer molecule on the surface of the molded plastic or the molecule of the polymer to be modified.

The use of carbon monoxide and oxygen as the reaction gases can introduce a carboxyl group into a carbon atom constituting polymer molecules on the surface of the molded plastic or constituting molecules of the polymer to be modified. The ratio of carbon monoxide to oxygen is such that carbon monoxide/oxygen (by mole) is about 1/99 to 99/1, and preferably about 10/90 to 99/1.

When oxygen is used as the reaction gas and the 1,2-dicarbonyl compound or its hydroxy reductant exits in the reaction system, an acyl group [an $R^aC(=O)$— or $R^bC(=O)$— when the compound represented by the formula (4) is used] is introduced into a carbon atom (particularly, a methine carbon atom) constituting the polymer molecule on the surface of the molded plastic or constituting the molecule of the polymer to be modified, as described above.

When the nitrogen oxide (or nitrogen oxide with oxygen) is used as the reaction gas, a nitro group is introduced into a carbon atom constituting the polymer molecule on the surface of the molded plastic or constituting the molecule of the polymer to be modified. When the sulfur oxide (or sulfur oxide with oxygen) is used as the reaction gas, $SO_3H$ group, $SO_2H$ group or the like is introduced into a carbon atom constituting the polymer molecule on the surface of the molded plastic or constituting the molecule of the polymer to be modified.

The amount of the reaction gas can be appropriately selected in consideration of, for example, a reaction rate, a desired amount of hydrophilic group to be introduced, and operability.

The molded plastic is generally treated by immersing the molded article in a solvent containing the imide compound and introducing the reaction gas into the solvent. The polymer is generally treated by dissolving the polymer in a solvent in which the polymer can be dissolved and which contains the imide compound, and introducing the reaction gas into the solution. The reaction gas can also be liquified before introduction.

The solvent can be appropriately selected depending on the type of a polymer constituting the molded plastic or of the polymer to be modified. Such solvents include, but are not limited to, acetic acid, propionic acid, and other organic acids; acetonitrile, propionitrile, benzonitrile, and other nitriles; formamide, acetamide, dimethylformamide (DMF), dimethylacetamide, and other amides; t-butanol, t-amyl alcohol, and other alcohols; hexane, octane, and other aliphatic hydrocarbons; benzene, and other aromatic hydrocarbons; chloroform, dichloromethane, dichloroethane, carbon tetrachloride, chlorobenzene, dichlorobenzene, trifluoromethylbenzene, and other halogenated hydrocarbons; nitrobenzene, nitromethane, nitroethane, and other nitro compounds; ethyl acetate, butyl acetate, and other esters; diethyl ether, diisopropyl ether, and other ethers; and mixtures of these solvents. An appropriate amount of water may be added to the solvent. In many cases, acetic acid and other organic acids, benzonitrile and other nitriles, chlorobenzene, trifluoromethylbenzene, and other halogenated hydrocarbons are used as the solvents.

When the surface of the molded plastic is to be modified, the solvent should be preferably one which has an affinity for a polymer constituting the molded plastic but does not dissolve the polymer, in order to keep the surface shape of the molded plastic from changing.

A treating temperature (reaction temperature) can be appropriately selected depending on, for example, the type of a polymer constituting the molded plastic or of the polymer to be modified, and the type of the reaction gas. For example, when oxygen is used as the reaction gas to thereby introduce a hydroxyl group or an oxo group into a carbon atom of the molded article polymer or of the polymer to be modified, the treating temperature is about 0° C. to 300° C., and preferably about 30° C. to 250° C. (e.g., about 40° C. to 150° C.). When carbon monoxide and oxygen are used as the reaction gases to thereby introduce a carboxyl group into a carbon atom of the molded article polymer or of the polymer to be modified, the treating temperature is, for example, about 0° C. to 200° C., and preferably about 10° C. to 150° C. When the nitrogen oxide or sulfur oxide is used as the reaction gas, the treating temperature is, for example, about 0° C. to 150° C., and preferably about 10° C. to 125° C. The treatment can be performed at atmospheric pressure or under a pressure (under a load). When the treatment is performed under a pressure, the pressure is usually about 1 to 100 atm (0.1 to 10 MPa) [e.g., about 1.5 to 80 atm (0.15 to 8.1 MPa)], and preferably about 2 to 70 atm (0.2 to 7.1 MPa). A treating time can be appropriately selected within a range of, for example, about 30 minutes to 48 hours, depending on the treating temperature and treating pressure.

The degree of hydrophilicity of the molded plastic surface or the amount of polar group to be introduced into the polymer to be modified (introduction rate of functional group) can be controlled by adjusting the concentration of the reaction gas, treating temperature, treating time, and other reaction conditions. The treatment can be performed by a conventional technique such as batch system, semi-batch system, or continuous system in the presence of, or under flow of the reaction gas.

The above treatment can introduce a hydroxyl group and other hydrophilic groups into a carbon atom constituting the surface polymer of the molded plastic to thereby impart hydrophilicity to the surface of the molded plastic. The resulting surface-modified molded plastic is useful as optical lenses, optical disks, and other optical materials.

When the polymer is modified, the modified polymer can be separated by subjecting a reaction mixture to a conventional separation and purification procedure such as reprecipitation, crystallization, recrystallization, and filtration, after the treatment of the polymer with the reaction gas. The above-prepared modified polymer has a hydroxyl group or another polar group introduced into a carbon atom constituting the polymer and therefore has, for example, a higher antistatic property than the original polymer.

According to the invented method for the surface modification of a molded plastic, a hydroxyl group or another hydrophilic group can be introduced only to a carbon atom constituting a surface polymer of the molded plastic, by action of the oxygen-atom-containing gas and by catalysis of the imide compound having a specific structure. Consequently, the hydrophobicity of inside polymers which occupy the majority of the molded plastic can be kept as intact, and the hygroscopicity of the overall molded article does not significantly change as compared with that before the surface modification. Changes in refractive index or in dimension due to moisture absorption can therefore be minimized. In contrast, the surface of the molded plastic has an improved hydrophilicity to thereby increase adhesion and adhesive property to a variety of coating agents (coating films), and he surface of the molded article shows promise for antistatic property. The invented method can be applied to a wide variety of molded polymers each having a primary, secondary, or tertiary carbon atom, and is very excellent in general versatility, as the shape of the molded article is not critical as far as a treating solution can come in contact with the surface thereof. In addition, the degree of hydrophilicity of the molded article surface can be controlled by adjusting reaction conditions (e.g., temperature and time).

The invented surface-modified molded plastic can be obtained by the aforementioned method and is satisfactory in optical and dimensional stability and is excellent in adhesion and adhesive property to coating films and in antistatic property.

The invented method for modifying a polymer can introduce a hydroxyl group or another polar group into a carbon atom constituting the polymer with an easy operation, by action of the oxygen-atom-containing gas and by catalysis of the imide compound having a specific structure. Accordingly, the invented method can greatly improve electrification property and other characteristics of the polymer or can impart a special function to the polymer. The invented method does not require special monomers, and materials for use in the method are not limited to specific polymers, and therefore the method can be applied to a very wide variety of applications. Especially, the invented method has an advantage that it can introduce a polar group directly into a carbon atom constituting a non-aromatic group which is in common in hydrophobic polymers (nonpolar polymers), such as a methylene or methine carbon atom in a principle chain. In addition, the product modified polymer can be produced in a required amount as occasion demands using polystyrene, polypropylene, and other general-purpose polymers, and the method is hence efficient. The invented method can also introduce a polar group without cleaving a principle chain. Additionally, a desired functional group (polar group) can be introduced in a desired proportion by controlling the type and concentration of the reaction gas and reaction conditions (e.g., temperature and time).

The invented modified polymer can be obtained by the aforementioned method and is satisfactory in electrification property and other characteristics.

The present invention will be illustrated in further detail with reference to several examples below, which are not intended to limit the scope of the invention.

EXAMPLE 1

A polypropylene [FL 100, produced by Grand Polymer Co., Ltd.] was hot-pressed and was cut to a predetermined size to thereby yield a polypropylene sheet (10 mm×30 mm×1.0 mm in thickness). The polypropylene sheet was washed with an aqueous surfactant solution and methanol sequentially, and was immersed in a mixture containing 5 mmol of N-hydroxyphthalimide, 0.05 mmol of acetylacetonatocobalt (II), and 30 ml of acetic acid, and was allowed to stand at 75° C. in an oxygen atmosphere [1 atm (0.1 MPa)] for 4 hours for oxidation treatment.

The contact angle of water and water absorption of the polypropylene sheet prior to and subsequent to the treatment were determined, according to the following methods. The results are shown in Table 1.

Contact Angle of Water

A total of 0.006 cc of pure water was placed dropwise to the surface of a sample, and the contact angle (deg) of droplet was determined with an automatic contact angle meter [produced by Kyowa Interface Science Co., Ltd. under the type of CA-Z].

Water Absorption

A sample was immersed in pure water at 25° C. and was allowed to stand for 24 hours. The ratio of the increment of the weight of the sample after 24 hours to a dry weight was determined and was defined as the water absorption (%).

EXAMPLE 2

A polystyrene [31N, produced by Daicel Chemical Industries, Ltd.] was hot-pressed and was cut to a predetermined size to yield a polystyrene sheet (10 mm×30 mm×1.0 mm in thickness). The procedure of Example 1 was repeated except that the polystyrene sheet was used instead of the polypropylene sheet. The contact angle of water and water absorption of the sheet prior to and subsequent to the treatment were determined in the same manner as in Example 1. The results are shown in Table 1.

EXAMPLE 3

A low-density polyethylene [G109, produced by Sumitomo Chemical Industries, Ltd.] was hot-pressed and was cut to a predetermined size to yield a low-density polyethylene sheet (10 mm×30mm×1.0 mm in thickness). The procedure of Example 1 was repeated, except that the low-density polyethylene sheet was used instead of the polypropylene sheet. The contact angle of water and water absorption of the sheet prior to and subsequent to the treatment were determined in the same manner as in Example 1. The results are shown in Table 1.

EXAMPLE 4

A metallocene-catalyzed polyethylene [Umerit 1520F, produced by Ube Industries, Ltd.] was hot-pressed and was cut to a predetermined size to yield a metallocene-catalyzed polyethylene sheet (10 mm×30 mm×1.0 mm in thickness). The procedure of Example 1 was repeated, except that the metallocene-catalyzed polyethylene sheet was used instead of the polypropylene sheet. The contact angle of water and water absorption of the sheet prior to and subsequent to the treatment were determined in the same manner as in Example 1. The results are shown in Table 1.

EXAMPLE 5

A cyclopentadiene-based polymer [ZEONEX 450, produced by Nippon Zeon Co., Ltd.] was hot-pressed and was cut to a predetermined size to yield a cyclopentadiene-based polymer sheet (10 mm×30 mm×1.0 mm in thickness). The procedure of Example 1 was repeated, except that the low-density polyethylene sheet was used instead of the polypropylene sheet. The contact angle of water and water absorption of the sheet prior to and subsequent to the treatment were determined in the same manner as in Example 1. The results are shown in table 1.

EXAMPLE 6

A polypropylene [FL 100, produced by Grand Polymer Co., Ltd.] was hot-pressed and was cut to a predetermined size to yield a low-density polyethylene sheet (10 mm×30 mm×1.0 mm in thickness). The polypropylene sheet was washed with an aqueous surfactant solution and methanol sequentially, was immersed in a mixture containing 5 mmol of N-hydroxyphthalimide, 0.05 mmol of acetylacetonatocobalt (II), 30 mmol of adamantane, and 30 ml of acetic acid, and was allowed to stand at 75° C. in an oxygen atmosphere [1 atm (0.1 MPa)] for 1 hour for oxidation treatment.

The contact angle of water and water absorption of the prior to and subsequent to the treatment were determined e same manner as in Example 1. The results are shown in 1.

TABLE 1

| Exam- | | Contact Angle (deg) | | Water Absorption (%) | |
|---|---|---|---|---|---|
| ple | Sheet Material | Untreated | Treated | Untreated | Treated |
| 1 | polypropylene | 101.4 | 90.5 | 0.07 | 0.07 |
| 2 | polystyrene | 83.1 | 79.8 | 0.02 | 0.02 |
| 3 | low-density | 93.2 | 80.2 | 0.03 | 0.03 |

TABLE 1-continued

| Exam- | | Contact Angle (deg) | | Water Absorption (%) | |
|---|---|---|---|---|---|
| ple | Sheet Material | Untreated | Treated | Untreated | Treated |
| 4 | polyethylene metallocene-catalyzed polyethylene | 93.3 | 80.8 | <0.01 | <0.01 |
| 5 | cyclopentadiene-based polymer | 83.1 | 75.2 | <0.01 | <0.01 |
| 6 | polypropylene | 101.4 | 88.2 | 0.07 | 0.07 |

Table 1 shows that the plastic sheets oxidized according to the examples had an equivalent water absorption but exhibited a greatly decreased contact angle of water as compared with those prior to the treatment, indicating that hydrophilicity of the sheet surfaces was improved.

EXAMPLE 7

A mixture containing 3 g of a polystyrene [produced by Daicel Chemical Industries, Ltd. under the trade name of "31N"], 5 mmol of N-hydroxyphthalimide, 0.05 mmol of acetonatocobalt Co(AA)$_2$, and 30 ml of chlorobenzene was stirred at 75° C. in an oxygen atmosphere [1 atm (0.1 MPa)] for 3 hours.

The resulting reaction mixture was put into methanol for reprecipitation to thereby yield a modified polystyrene. The modified polystyrene was dissolved in 10 ml of chloroform and was then purified by putting the solution into methanol for reprecipitation. The purification procedure was repeated three times to thereby yield about 3 g of an ultimately purified modified polystyrene.

Figure 2:
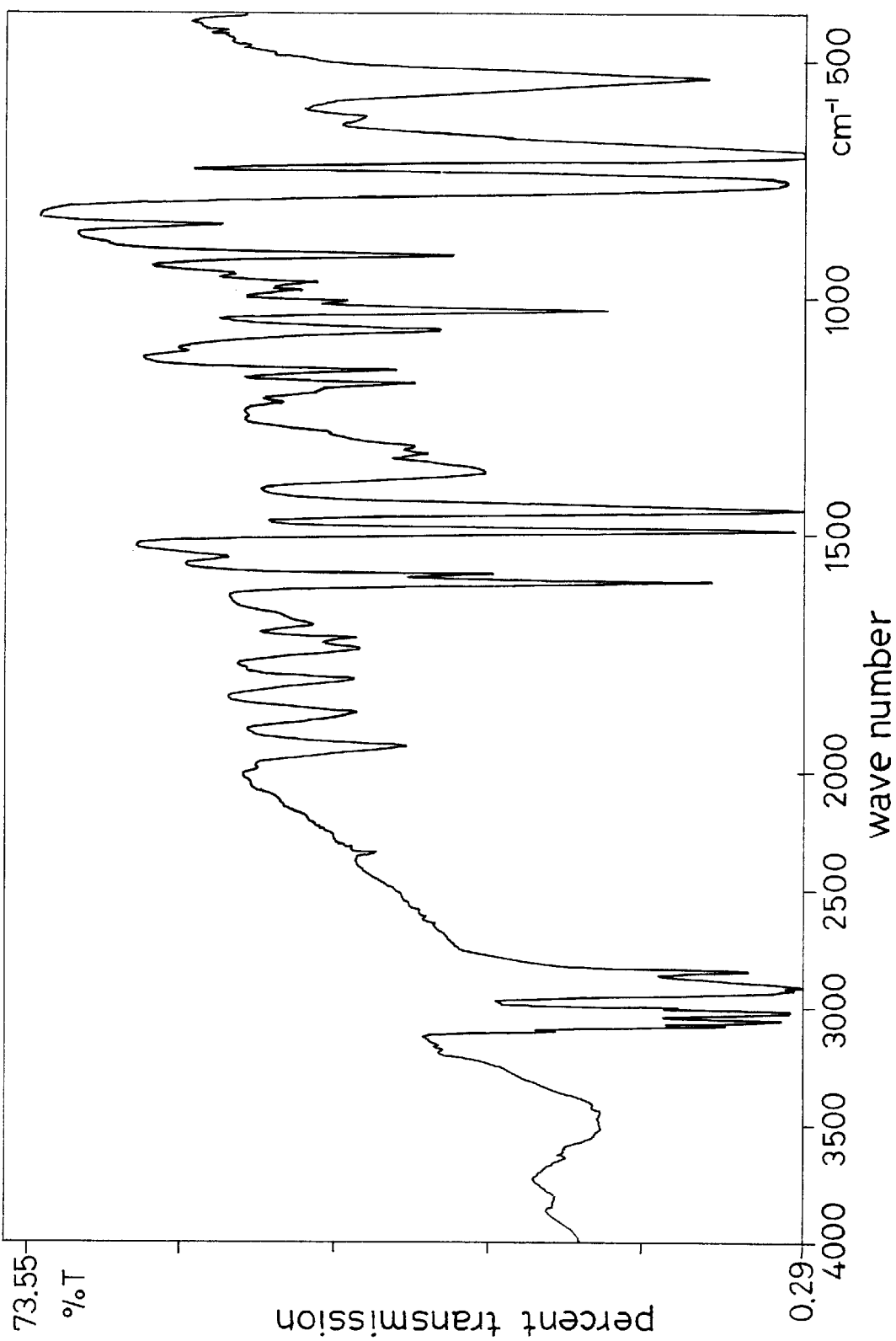
FIG. 2 is an infrared absorption spectrum of a modified polymer in Example 7.

The above-prepared modified polystyrene was subjected to infrared absorption spectrometry (FT-IR) to thereby find a characteristic absorption of hydroxyl group in the vicinity of 3500 cm$^{-1}$, indicating that hydroxyl groups were introduced into the polymer. FIG. 1 shows an infrared absorption spectrum of the polystyrene prior to modification, and FIG. 2 shows an infrared absorption spectrum of the modified polystyrene.

Separately, samples were taken from the polystyrene prior to and subsequent to modification respectively, and were hot-pressed to yield 30 mm×50 mm×1 mm sheets. A total of 0.006 cc of pure water was dropped onto the surface of the sheet and the contact angle (deg) of droplet was determined with an automatic contact angle meter [type CA-Z, produced by Kyowa Interface Science Co., Ltd.]. The contact angle is an index of hydrophilicity. The results are shown in Table 2.

EXAMPLE 8

A modified polymer was obtained in the same manner as in Example 7, except that a cyclopentadiene-based polymer [produced by Nippon Zeon Co., Ltd. under the trade name of "ZEONEX 450"] was used instead of the polypropylene.

Figure 3:
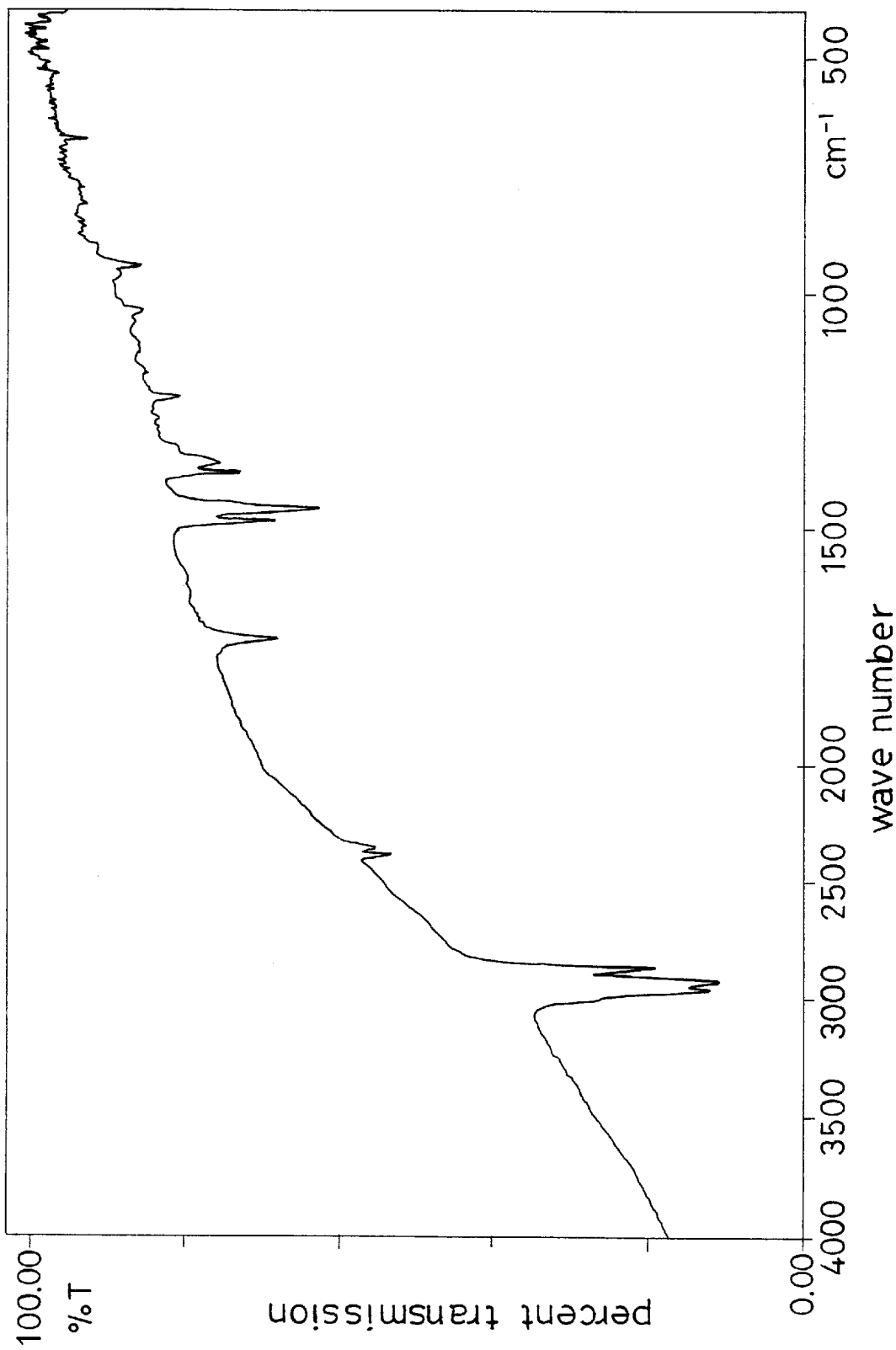
FIG. 3 is an infrared absorption spectrum of a polymer (cyclopentadiene-based polymer) prior to modification in Example 8.
Figure 4:
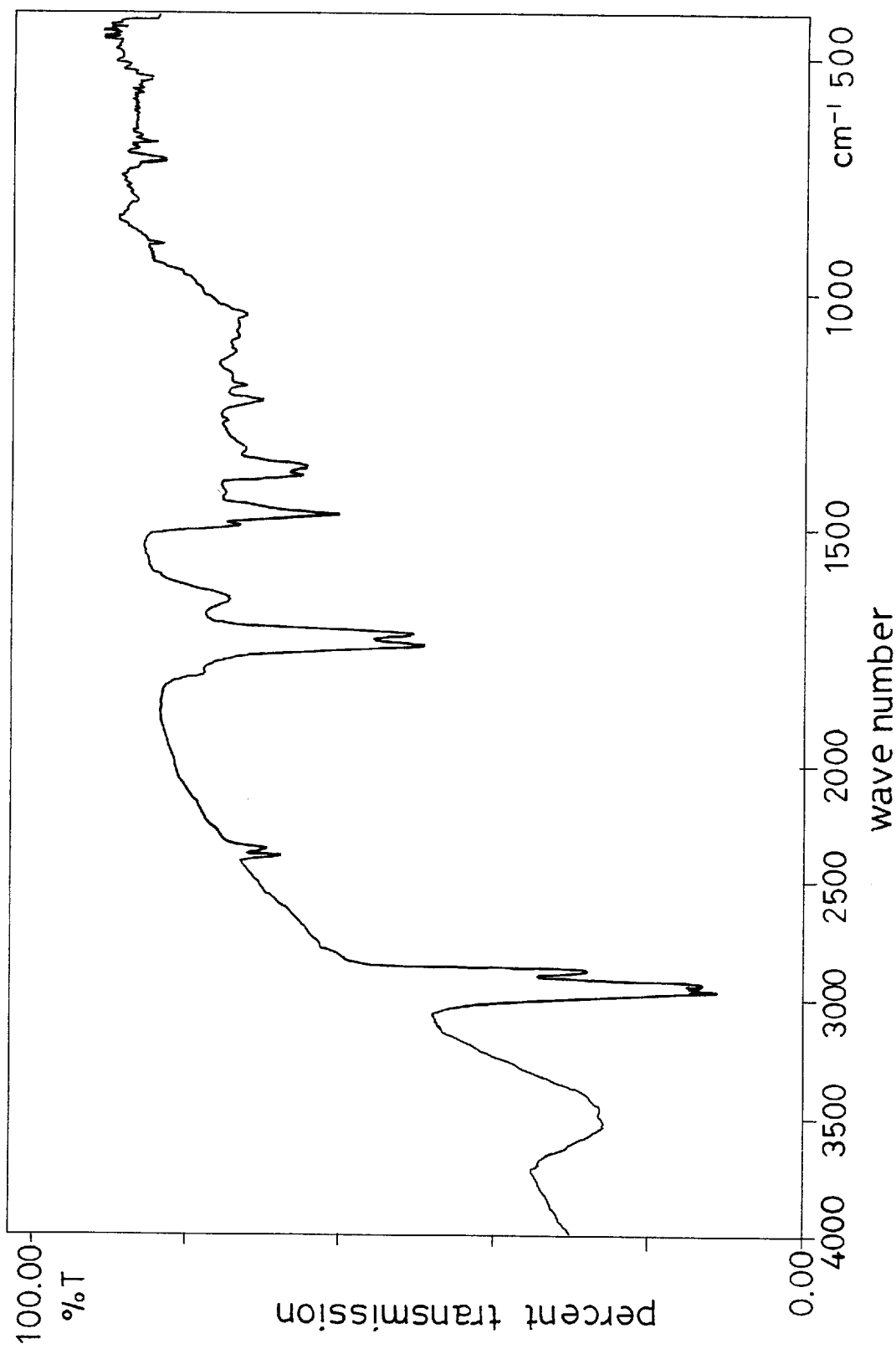
FIG. 4 is an infrared absorption spectrum of a modified polymer in Example 8.

The above-prepared modified polymer was subjected to infrared absorption spectrometry (FT-IR) to thereby find a characteristic absorption of hydroxyl group in the vicinity of 3500 cm$^{-1}$, indicating that hydroxyl groups were introduced intothepolymer. FIG. 3 shows an infrared absorption spectrum of the cyclopentadiene-based polymer prior to modification, and FIG. 4 shows an infrared absorption spectrum of the modified cyclopentadiene-based polymer.

Each of samples taken prior to and subsequent to modification was dissolved in chloroform and was subject to solution casting to yield a 30 mm×50 mm×0.1 mm sheet. A total of 0.006 cc of pure water was dropped onto the surface of the sheet and the contact angle (deg) of water was determined with an automatic contact angle meter [type CA-Z, produced by Kyowa Interface Science Co., Ltd.]. The results are shown in Table 2.

EXAMPLE 9

A total of 10 g of 3,5-dimethyladamant-1-yl methacrylate was dissolved in 40 ml of toluene, 0.1 g of azobisisobutyronitrile (AIBN) as an initiator was added to the solution, and the resulting mixture was stirred at 60° C. for 5 hours for polymerization. The polymerization solution was dropped into methanol and was reprecipitated to thereby yield a poly(3,5-dimethyladamant-1-yl methacrylate). This substance was purified by dissolving in 20 ml of toluene and reprecipitating in methanol. The purification procedure was repeated twice to yield about 9 g of a purified poly(3,5-dimethyladamant-1-ylmethacrylate). The obtained polymer had an Mn of 21000 and an Mw/Mn of 1.8 in molecular weight.

A modified poly(3,5-dimethyladamant-1-yl methacrylate) was obtained in the same manner as in Example 7, except that the above-prepared poly(3,5-dimethyladamant-1-yl methacrylate) was used instead of the polypropylene.

Figure 5:
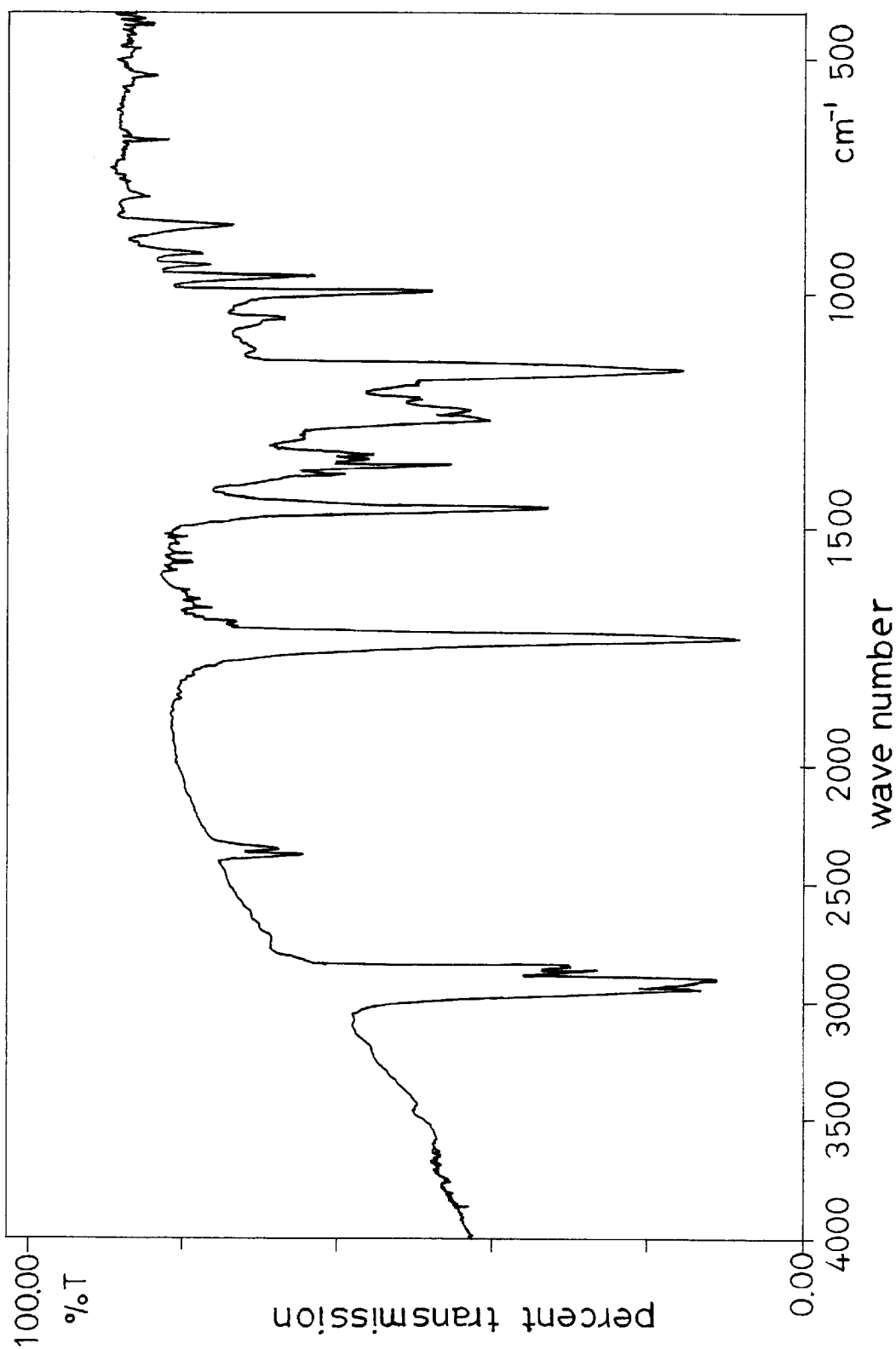
FIG. 5 is an infrared absorption spectrum of a polymer [poly(3,5-dimethyladamant-1-yl methacrylate)] prior to modification in Example 9.
Figure 6:
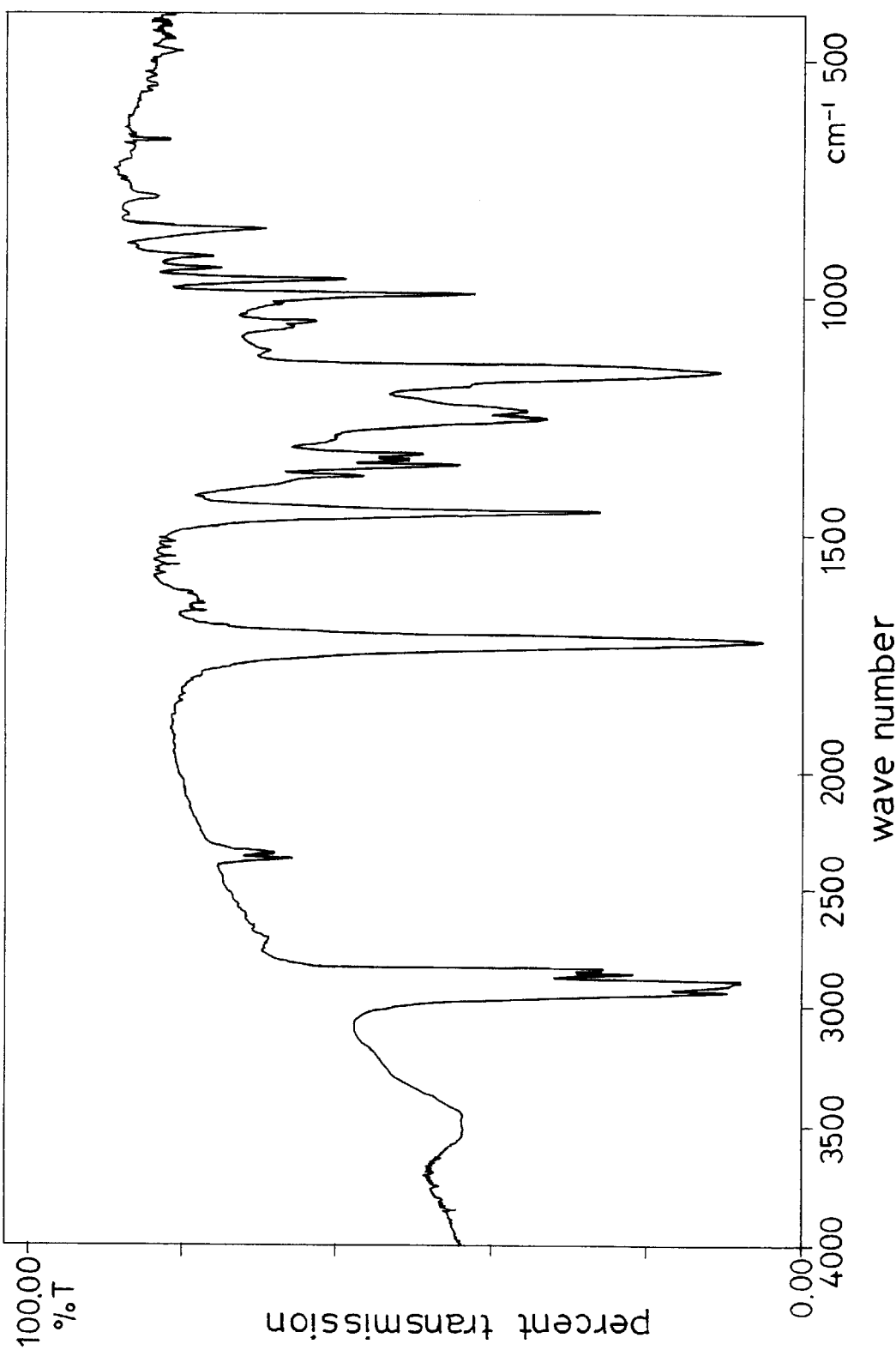
FIG. 6 is an infrared absorption spectrum of a modified polymer in Example 9.

The above-prepared modified polymer was subjected to infrared absorption spectrometry (FT-IR) to thereby find a characteristic absorption of hydroxyl group in the vicinity of 3500 cm$^{-1}$, indicating that hydroxyl groups were introduced into the polymer. FIG. 5 shows an infrared absorption spectrum of the poly(3,5-dimethyladamant-1-yl methacrylate) prior to modification, and FIG. 6 shows an infrared absorption spectrum of the modified poly(3,5-dimethyladamant-1-yl methacrylate).

The contact angle (deg) of droplet in samples prior to and subsequent to modification was determined in the same manner as in Example 8. The results are shown in Table 2.

EXAMPLE 10

A purified poly(1-adamantyl acrylate) and a modified poly(1-adamantyl acrylate) were prepared in the same manner as in Example 9, except that 1-adamantyl acrylate was used instead of 3,5-dimethyladamant-1-yl methacrylate.

Figure 7:
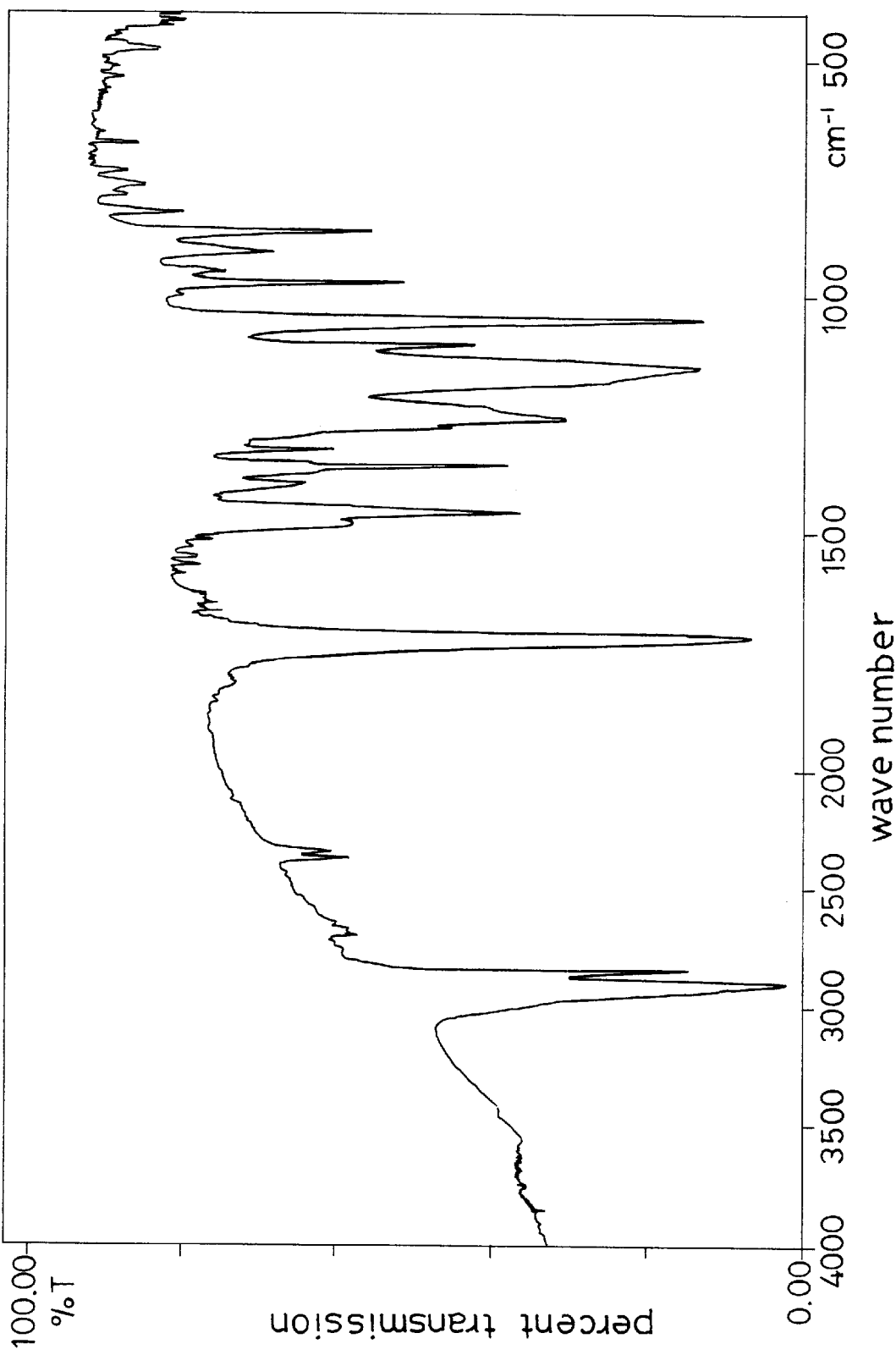
FIG. 7 is an infrared absorption spectrum of a polymer [poly(1-adamantyl acrylate)] prior to modification in Example 10.
Figure 8:
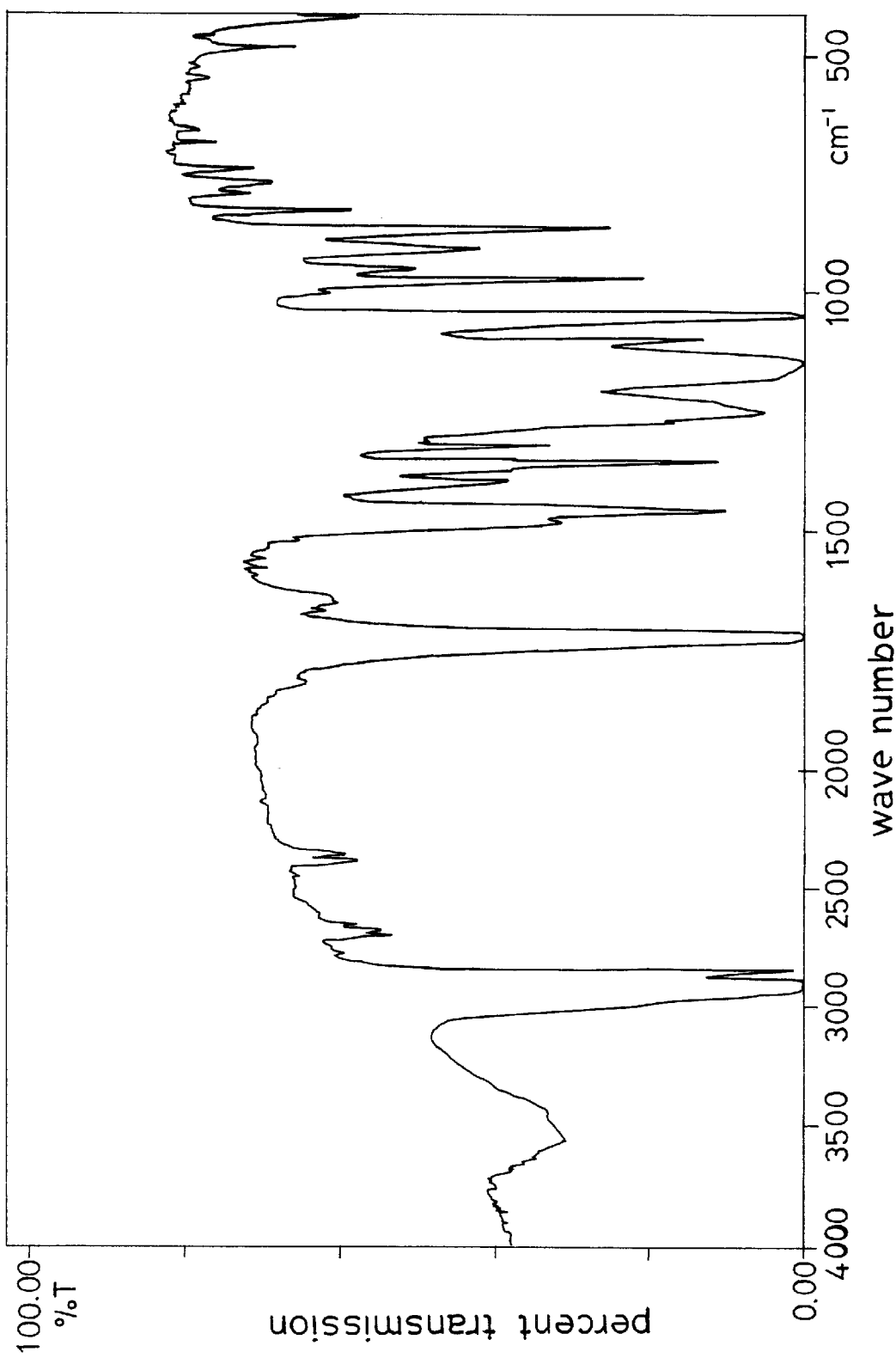
FIG. 8 is an infrared absorption spectrum of a modified polymer in Example 10.

The above-prepared modified polymer was subjected to infrared absorption spectrometry (FT-IR) to thereby find a characteristic absorption of hydroxyl group in the vicinity of 3500 cm$^{-1}$, indicating that hydroxyl groups were introduced into the polymer. FIG. 7 shows an infrared absorption spectrum of the poly(1-adamantyl acrylate) prior to modification, and FIG. 8 shows an infrared absorption spectrum of the modified poly(1-adamantyl acrylate).

The contact angle (deg) of droplet in samples prior to and subsequent to modification was determined in the same manner as in Example 8. The results are shown in Table 2.

EXAMPLE 11

A mixture of 3 g of a polystyrene [produced by Daicel Chemical Industries, Ltd. under the trade name of "31N"], 5 mmol of N-hydroxyphthalimide, 0.05 mmol of acetylacetonatocobalt Co(AA)$_2$, 20 mmol of adamantane, and 30 ml of chlorobenzene was stirred at 75° C. in an oxygen atmosphere [1 atm (0.1 MPa)] for 1 hour.

The resulting reaction mixture was dropped into methanol and was reprecipitated to thereby yield a modified polystyrene. This substance was dissolved in 10 ml of chloroform and was then purified by adding dropwise to methanol for reprecipitation. The purification procedure was repeated three times to yield about 3 g of an ultimately purified modified polystyrene.

The above-prepared modified polystyrene was subjected to infrared absorption spectrometry (FT-IR) to thereby find a characteristic absorption of hydroxyl group in the vicinity of 3500 cm$^{-1}$, indicating that hydroxyl groups were introduced into the polymer.

The contact angle (deg) of droplet in samples prior to and subsequent to modification was determined in the same manner as in Example 7. The results are shown in Table 2.

EXAMPLE 12

A mixture of 3 g of a polystyrene [produced by Daicel Chemical Industries, Ltd. under the trade name of "31N"], 5 mmol of N-hydroxyphthalimide, 0.05 mmol of acetylacetonatocobalt Co (AA)$_2$, 20 mmol of adamantane, 25 ml of chlorobenzene, and 5 ml of acetic acid was stirred at 75° C. in an oxygen atmosphere [1 atm (0.1 MPa)] for 0.5 hour. In this connection, a resin was precipitated with the addition of acetic acid, but the mixture became a homogenous solution as a reaction proceeded.

The resulting reaction mixture was added dropwise into methanol and was reprecipitated to thereby yield a modified polystyrene. This substance was dissolved in 10 ml of chloroform and was then purified by adding dropwise into methanol for reprecipitation. The purification procedure was repeated three times to yield about 3 g of an ultimately purified modified polystyrene.

The above-prepared modified polystyrene was subjected to infrared absorption spectrometry (FT-IR) to thereby find a characteristic absorption of hydroxyl group in the vicinity of 3500 cm$^{-1}$, indicating that hydroxyl groups were introduced into the polymer.

The contact angle (deg) of droplet in samples prior to and subsequent to modification was determined in the same manner as in Example 7. The results are shown in Table 2.

TABLE 2

| | | Contact Angle (deg) | |
|---|---|---|---|
| Example | Polymer | Unmodified | Modified |
| 7 | polystyrene | 83.1 | 77.5 |
| 8 | cyclopentadiene-based polymer | 80.9 | 75.5 |
| 9 | poly(dimethyladamantyl methacrylate) | 84.3 | 80.6 |
| 10 | poly(adamantyl acrylate) | 80.5 | 78.5 |
| 11 | polystyrene | 83.1 | 79.5 |
| 12 | polystyrene | 83.1 | 77.4 |

Table 2 shows that the polymers modified according to the examples had a largely decreased contact angle of water and an improved hydrophilicity, as compared with those prior to modification.

What is claimed is:

1. A method for the surface modification of a molded plastic, comprising the step of immersing a molded plastic in a solvent containing an imide compound represented by the following formula (1):

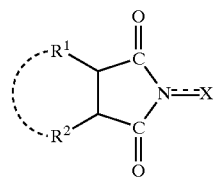

(1)

wherein $R^1$ and $R^2$ are each, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, or $R^1$ and $R^2$ are optionally combined to provide a double bond between the two adjacent carbon atoms to which $R^1$ and $R^2$ are attached or an aromatic or non-aromatic ring; X is an oxygen atom or a hydroxyl group; and one or two of N-substituted cyclic imido group represented by the formula:

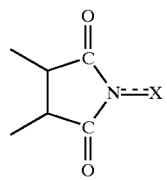

indicated in the formula (1) are optionally further formed on the $R^1$, $R^2$, or on the double bond or aromatic or non-aromatic ring formed by $R^1$ and $R^2$, and introducing an oxygen-atom-containing gas into the solvent.

2. A method for the surface modification of a molded plastic according to claim 1, wherein said oxygen-atom-containing gas is at least one selected from the group consisting of oxygen, carbon monoxide, nitrogen oxides, and sulfur oxides.

3. A surface-modified molded plastic obtained by treating a molded plastic according to the method of claim 1 or claim 2.

4. A method for modifying a polymer, comprising the step of dissolving a polymer in a solvent containing an imide compound represented by the following formula (1):

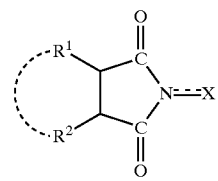

(1)

wherein $R^1$ and $R^2$ are each, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, or $R^1$ and $R^2$ are optionally combined to provide a double bond between the two adjacent carbon atoms to which $R^1$ and $R^2$ are attached or an aromatic or non-aromatic ring; X is an oxygen atom or a hydroxyl group; and one or two of N-substituted cyclic imido group represented by the following formula:

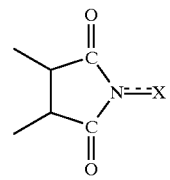

indicated in the formula (1) are optionally further formed on the $R^1$, $R^2$, or on the double bond or aromatic or non-aromatic ring formed by $R^1$ and $R^2$, and introducing an oxygen-atom-containing gas into the resulting solution.

5. A method for modifying a polymer according to claim 4, wherein said oxygen-atom-containing gas is at least one selected from the group consisting of oxygen, carbon monoxide, nitrogen oxides, and sulfur oxides.

6. A modified polymer obtained by treating a polymer according to the method of claim 4 or claim 5.

* * * * *